(12) United States Patent
Hsueh et al.

(10) Patent No.: US 11,194,128 B2
(45) Date of Patent: Dec. 7, 2021

(54) PHOTOGRAPHING OPTICAL LENS ASSEMBLY, IMAGE CAPTURING APPARATUS AND ELECTRONIC DEVICE

(71) Applicant: LARGAN PRECISION CO., LTD., Taichung (TW)

(72) Inventors: Chun-Che Hsueh, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 207 days.

(21) Appl. No.: 16/507,281

(22) Filed: Jul. 10, 2019

(65) Prior Publication Data
US 2020/0233180 A1 Jul. 23, 2020

(30) Foreign Application Priority Data
Jan. 21, 2019 (TW) ................. 108102230

(51) Int. Cl.
| G02B 13/00 | (2006.01) |
| G02B 27/00 | (2006.01) |
| G02B 5/20 | (2006.01) |
| G02B 7/02 | (2021.01) |
| H04N 5/225 | (2006.01) |

(52) U.S. Cl.
CPC ........... G02B 13/0045 (2013.01); G02B 5/20 (2013.01); G02B 7/021 (2013.01); G02B 27/0025 (2013.01); *H04N 5/2254* (2013.01)

(58) Field of Classification Search
CPC ...... G02B 5/20; G02B 27/0025; G02B 7/021; G02B 9/64; G02B 13/0045; G02B 13/002

USPC .................................................. 359/708, 755
See application file for complete search history.

(56) References Cited

U.S. PATENT DOCUMENTS

| 2015/0378131 A1 | 12/2015 | Tang et al. | |
| 2016/0299319 A1* | 10/2016 | Tang | G02B 9/64 |
| 2017/0184819 A1* | 6/2017 | Shi | G02B 27/0025 |
| 2017/0184820 A1* | 6/2017 | Shi | G02B 27/0025 |
| 2017/0184821 A1* | 6/2017 | Shi | G02B 27/0025 |
| 2018/0188500 A1* | 7/2018 | Jung | G02B 13/0045 |

(Continued)

FOREIGN PATENT DOCUMENTS

| CN | 108279486 A | 7/2018 |
| CN | 108873253 A | 11/2018 |

(Continued)

*Primary Examiner* — William R Alexander
(74) *Attorney, Agent, or Firm* — Locke Lord LLP; Tim Tingkang Xia, Esq.

(57) ABSTRACT

A photographing optical lens assembly includes seven lens elements, the seven lens elements being, in order from an object side to an image side: a first lens element, a second lens element, a third lens element, a fourth lens element, a fifth lens element, a sixth lens element and a seventh lens element. The third lens element with positive refractive power has an image-side surface being convex in a paraxial region thereof. The fourth lens element has an image-side surface being concave in a paraxial region thereof. The sixth lens element with positive refractive power has an object-side surface being concave in a paraxial region thereof and an image-side surface being convex in a paraxial region thereof. The seventh lens element has an image-side surface being concave in a paraxial region thereof and having at least one critical point in an off-axis region thereof.

23 Claims, 17 Drawing Sheets

(56) References Cited

U.S. PATENT DOCUMENTS

| | | |
|---|---|---|
| 2018/0196226 A1 | 7/2018 | Chang et al. |
| 2018/0196233 A1 | 7/2018 | Chang et al. |
| 2020/0003992 A1 | 1/2020 | Fan et al. |
| 2020/0003993 A1 | 1/2020 | Fan et al. |
| 2020/0400924 A1 | 12/2020 | Xu et al. |

FOREIGN PATENT DOCUMENTS

| | | | |
|---|---|---|---|
| CN | 108957691 | A | 12/2018 |
| CN | 108957692 | A | 12/2018 |
| CN | 109358410 | A | 2/2019 |
| JP | H05034593 | A | 2/1993 |
| JP | 2015072403 | A | 4/2015 |
| JP | 2015072405 | A | 4/2015 |

\* cited by examiner

PHOTOGRAPHING OPTICAL LENS ASSEMBLY, IMAGE CAPTURING APPARATUS AND ELECTRONIC DEVICE

RELATED APPLICATIONS

This application claims priority to Taiwan Application Serial Number 108102230, filed on Jan. 21, 2019, which is incorporated by reference herein in its entirety.

BACKGROUND

Technical Field

The present disclosure relates to a photographing optical lens assembly and an image capturing apparatus, and more particularly, to a photographing optical lens assembly and an image capturing apparatus applicable to electronic devices.

Description of Related Art

With the advancement of semiconductor process technology, the performance of electronic photosensitive devices has been improved, and pixels with smaller dimensions can be achieved. Therefore, optical lens systems featuring high image quality have become indispensable for modern electronic devices.

With new technologies changing rapidly, electronic devices equipped with optical lens systems have a wider range of applications. Also, the specification requirements for optical lens systems are more diversified. There is a need with modern optical lens systems in balancing the image quality, sensitivity, aperture size, device size or view angle, etc. easily.

SUMMARY

According to one aspect of the present disclosure, a photographing optical lens assembly includes seven lens elements, the seven lens elements being, in order from an object side to an image side: a first lens element, a second lens element, a third lens element, a fourth lens element, a fifth lens element, a sixth lens element, and a seventh lens element.

The third lens element has positive refractive power, the third lens element has an image-side surface being convex in a paraxial region thereof, the fourth lens element has an image-side surface being concave in a paraxial region thereof, the sixth lens element has positive refractive power, the sixth lens element has an object-side surface being concave in a paraxial region thereof and an image-side surface being convex in a paraxial region thereof, the seventh lens element has an image-side surface being concave in a paraxial region thereof and having at least one critical point in an off-axis region thereof, an object-side surface and image-side surface of the seventh lens element are both aspheric.

When a focal length of the photographing optical lens assembly is f, a curvature radius of the image-side surface of the fourth lens element is R8, a sum of central thicknesses of the seven lens elements is $\Sigma CT$, a sum of axial distances between each of adjacent lens elements of the photographing optical lens assembly is EAT, a curvature radius of the object-side surface of the third lens element is R5, a curvature radius of the image-side surface of the third lens element is R6, and the following conditions are satisfied:

$0.45 < f/R8$;

$2.75 < \Sigma CT/\Sigma AT$; and $0.10 < (R5+R6)/(R5-R6)$.

According to another aspect of the present disclosure, an image capturing apparatus includes the aforementioned photographing optical lens assembly and an image sensor.

According to another aspect of the present disclosure, an electronic device includes the aforementioned image capturing apparatus.

DETAILED DESCRIPTION

Figure 1A:
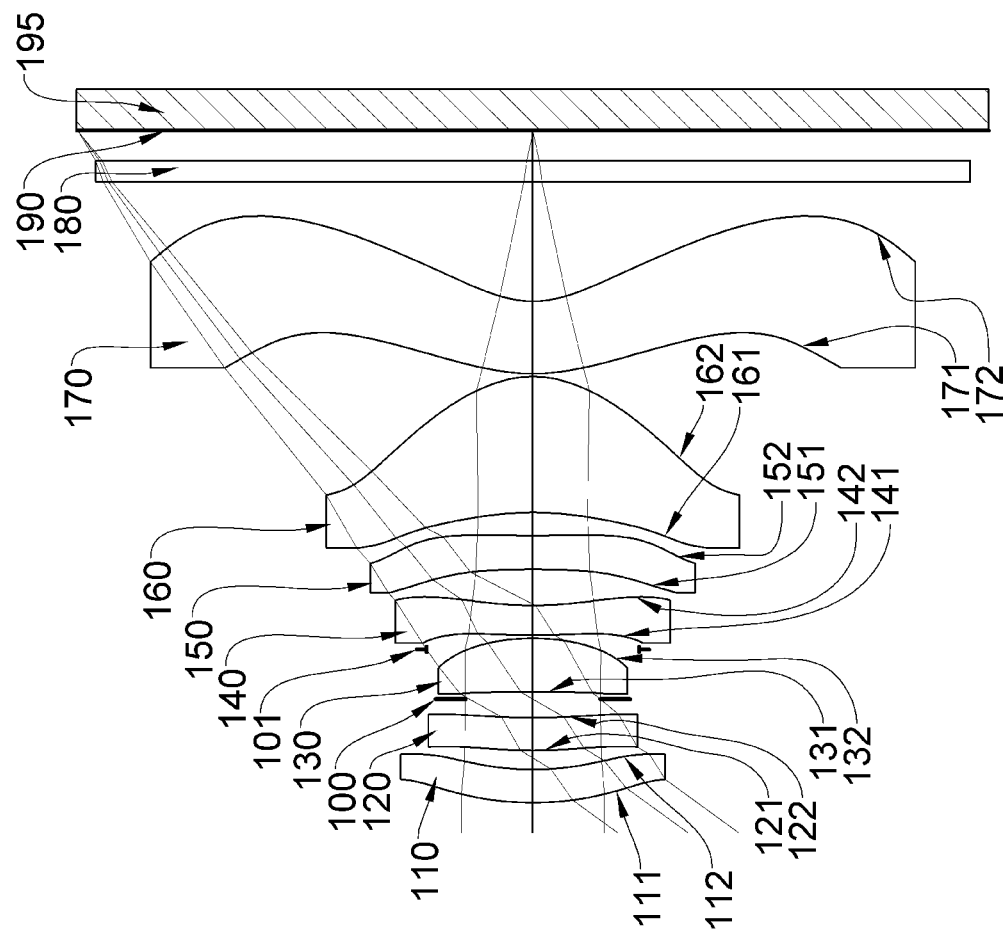
FIG. 1A is a schematic view of an image capturing apparatus according to the 1st embodiment of the present disclosure.

The present disclosure provides a photographing optical lens assembly including seven lens elements, the seven lens elements being, in order from an object side to an image side, a first lens element, a second lens element, a third lens element, a fourth lens element, a fifth lens element, a sixth lens element, and a seventh lens element.

The first lens element may have an image-side surface being concave in a paraxial region thereof for adjusting optical paths in tangential and sagittal directions so as to correct astigmatism favorably.

The third lens element has positive refractive power, which is favorable for providing the lens assembly with sufficient refractive power to reduce the sensitivity and the total track length thereof. The third lens element has an image-side surface being convex in a paraxial region thereof so as to correct spherical aberrations and improve light convergence.

The fourth lens element may have negative refractive power so as to correct aberrations of the lens assembly. The fourth lens element may have an object-side surface being convex in a paraxial region thereof, which is favorable for correcting astigmatism. The fourth lens element has at least one concave critical point in a paraxial region of the object-side surface, which is favorable for adjusting optical paths of the off-axis light rays. The fourth lens element has an image-side surface being concave in a paraxial region thereof, which is favorable for reducing the back focal length of the lens assembly to further miniaturizing the camera module. The fourth lens element may have at least one convex critical point in a paraxial region of the image-side surface, which is favorable for the convergence of the off-axis light rays.

The fifth lens element may have negative refractive power so that it can be arranged with the fourth lens element to further correct aberrations of the lens assembly.

The sixth lens element has positive refractive power to provide the lens assembly with sufficient refractive power so as to reduce the total track length of the lens assembly. The sixth lens element has an object-side surface being concave in a paraxial region thereof and an image-side surface being convex in a paraxial region thereof to further correct aberrations.

The seventh lens element may have an object-side surface being convex in a paraxial region thereof and having at least one concave critical point in an off-axis region thereof so as to correct off-axis aberrations favorably. The seventh lens element has an image-side surface being concave in a paraxial region thereof and having at least one critical point in an off-axis region thereof so as to adjust the back focal length of the lens assembly and the optical paths in the off-axis region.

A curvature radius of the image-side surface of the fourth lens element is R8, and a focal length of the photographing optical lens assembly is f. When the following condition is satisfied: $0.45<f/R8$, it is favorable for reducing the back focal length of the lens assembly and miniaturizing the camera module. Moreover, the following condition can be satisfied: $0.60<f/R8<3.0$. Moreover, the following condition can be satisfied: $0.75<f/R8<2.0$.

A sum of the central thicknesses of the seven lens elements is ΣCT, and a sum of axial distances between each of adjacent lens elements of the lens assembly is ΣAT. When the following condition is satisfied: $2.75<\Sigma CT/\Sigma AT$, it is favorable for properly utilizing the limited space to arrange the lens elements, thereby improving manufacturability effectively and ensuring desirable image quality. Moreover, the following condition can be satisfied: $3.0<\Sigma CT/\Sigma AT<5.0$.

A curvature radius of the object-side surface of the third lens element is R5, and a curvature radius of the image-side surface of the third lens element is R6. When the following condition is satisfied: $0.10<(R5+R6)/(R5-R6)$, the surface shapes of the third lens element will allow light entry at larger incident angles, which is favorable for providing a larger field of view and ensuring sufficient light in the off-axis region to improve relative illumination thereof. Moreover, the following condition can be satisfied: $0.50<(R5+R6)/(R5-R6)<5.0$. Moreover, the following condition can be satisfied: $1.0<(R5+R6)/(R5-R6)<2.50$.

The focal length of the photographing optical lens assembly is f, a focal length of the first lens element is f1, and a focal length of the second lens element is f2. When the following condition is satisfied: $|f/f1|+|f/f2|<0.60$, the refractive power distribution of the lens elements can be balanced so as to prevent the overall refractive power from overloading at the front end of the lens assembly, which may result in insufficient or excessive corrections and affect the image quality. Moreover, the following condition can be satisfied: $|f/f1|+|f/f2|<0.40$.

An effective radius on the object-side surface of the first lens element is Y11, and an effective radius on the image-side surface of the seventh lens element is Y72. When the following condition is satisfied: $Y11/Y72<0.50$, the opening at the front end of the lens assembly can be effectively reduced, which is favorable for miniaturizing the lens assembly and utilizing the module space more efficiently. Moreover, the following condition can be satisfied: $Y11/Y72<0.40$.

An Abbe number of the fourth lens element is V4, and an Abbe number of the fifth lens element is V5. When the following condition is satisfied: $20<V4+V5<75$, it is favorable for correcting chromatic aberration to avoid excessive dispersion. Moreover, the following condition can be satisfied: $25<V4+V5<55$.

The focal length of the photographing optical lens assembly is f, the focal length of the first lens element is f1, the focal length of the second lens element is f2, a focal length of the fourth lens element is f4, a focal length of the fifth lens element is f5, and a focal length of the sixth lens element is f6. When the following condition is satisfied: $1.0<|f/f6|/(|f/f1|+|f/f2|+|f/f4|+|f/f5|)<4.0$, the refractive power distribution of the lens elements can be balanced so as to prevent excessive refractive power at the rear end of the lens assembly, which may overcorrect light and affect the image quality. Moreover, the following condition can be satisfied: $1.50<|f/f6|/(|f/f1|+|f/f2|+|f/f4|+|f/f5|)<3.0$.

The maximum effective radius on the image-side surface of the seventh lens element is Y72, and the focal length of the photographing optical lens assembly is f. When the following condition is satisfied: $0.85<Y72/f$, the seventh lens element can have sufficient light effective area, which is favorable for controlling the chief ray angle (CRA) or light cone size at the image periphery so as to further control illuminance thereof.

A maximum effective radius on the image-side surface of the sixth lens element is Y62, a maximum effective radius on the object-side surface of the seventh lens element is Y71, and the focal length of the photographing optical lens assembly is f. When the following condition is satisfied: $0.20<|Y71-Y62|/f<0.50$, the lens assembly can have sufficient light effective area, which is favorable for increasing illuminance at the image periphery.

A central thickness of the first lens element is CT1, a central thickness of the second lens element is CT2, a central thickness of the third lens element is CT3, a central thickness of the fourth lens element is CT4, a central thickness of the fifth lens element is CT5, a central thickness of the sixth lens element is CT6, and a central thickness of the seventh lens element is CT7. When the following conditions are satisfied: 1.0<CT6/CT1; 1.0<CT6/CT2; 1.0<CT6/CT3; 1.0<CT6/CT4; 1.0<CT6/CT5; and 1.0<CT6/CT7, the sixth lens element can have a sufficient central thickness for improving the structural strength and manufacturability.

An Abbe number of a lens element in the photographing optical lens assembly is V, and a refractive index of the said lens element is N. When at least one lens element satisfies the following condition: 8.0<V/N<11.9, it is favorable for correcting chromatic aberration to avoid excessive dispersion. Moreover, at least two lens elements can satisfy the following condition: 8.0<V/N<11.9.

An axial distance between the object-side surface of the first lens element and an image surface is TL, and the focal length of the photographing optical lens assembly is f. When the following condition is satisfied: 1.5<TL/f<3.0, it is favorable for balancing between a wide angle of view and a short total track length. Moreover, the following condition can be satisfied: 1.75<TL/f<2.50.

The axial distance between the object-side surface of the first lens element and an image surface is TL, the focal length of the photographing optical lens assembly is f, and half of a maximum field of view of the photographing optical lens assembly is HFOV. When the following condition is satisfied: 2.0<TL/(f*sin(HFOV))<4.0, it is favorable for providing a sufficiently wide angle of view and a short total track length.

A maximum field of view of the photographing optical lens assembly is FOV. When the following condition is satisfied: 95 degrees<FOV<130 degrees, the lens assembly can have a sufficient field of view so as to become applicable in a wider variety of applications.

An f-number of the photographing optical lens assembly is Fno. When the following condition is satisfied: 1.2<Fno<2.8, it is favorable for enhancing the large-aperture feature provided by the lens assembly.

The axial distance between the object-side surface of the first lens element and an image surface is TL, and a maximum image height of the photographing optical lens assembly is ImgH (which may be half of a diagonal length of an effective sensing area of the image sensor). When the following condition is satisfied: 0.70<TL/ImgH<1.60, the photographing optical lens assembly can have a proper angle of view and a total track length.

The central thickness of the first lens element is CT1, the central thickness of the second lens element is CT2, and the central thickness of the sixth lens element is CT6. When the following condition is satisfied: 1.25<CT6/(CT1+CT2)<3.0, the sixth lens element can have a greater central thickness, which is favorable for the entire structure of the lens assembly. Moreover, the following condition can be satisfied: 1.50<CT6/(CT1+CT2)<2.50.

Each of the aforementioned features of the photographing optical lens assembly can be utilized in numerous combinations, so as to achieve the corresponding effects.

According to the photographing optical lens assembly of the present disclosure, the lens elements thereof can be made of glass or plastic material. When the lens elements are made of glass material, the distribution of the refractive power of the photographing optical lens assembly may be more flexible to design. Technologies such as grinding or molding can be used for producing glass lens elements. When the lens elements are made of plastic material, manufacturing costs can be effectively reduced. Furthermore, surfaces of each lens element can be arranged to be aspheric (ASP). Since these aspheric surfaces can be easily formed into shapes other than spherical shapes, more control variables can be obtained to eliminate aberrations and to further decrease the quantity of lens elements; meanwhile, the total track length of the photographing optical lens assembly can be effectively reduced. Processes such as plastic injection molding or glass molding can be used for making the aspheric surfaces of lens elements.

According to the photographing optical lens assembly of the present disclosure, if a surface of a lens element is aspheric, it means that the surface has an aspheric shape throughout its optically effective area, or a portion(s) thereof.

According to the photographing optical lens assembly of the present disclosure, when the lens element has a convex surface and the region of convex shape is not defined, it indicates that the surface can be convex in the paraxial region thereof. When the lens element has a concave surface and the region of concave shape is not defined, it indicates that the surface can be concave in the paraxial region thereof. Likewise, when the region of refractive power or focal length of a lens element is not defined, it indicates that the region of refractive power or focal length of the lens element can be in the paraxial region thereof.

According to the photographing optical lens assembly of the present disclosure, additives may be selectively added to the material of any one (or more) lens element to change the transmittance of said lens element in a particular wavelength range of light, so as to further reduce stray light and chromatic aberrations. For example, an additive that can filter off light in the wavelength range of 600-800 nm may be added to reduce extra red or infrared light, or an additive that can filter off light in the wavelength range of 350-450 nm may be added to reduce blue or ultraviolet light in the lens assembly. Thus, additives can prevent the interference caused to the image by light in a particular wavelength range. In addition, additives may be evenly mixed in the plastic material for manufacturing lens elements with an injection molding process.

According to the photographing optical lens assembly of the present disclosure, a point of inflection is a transition point at which the curvature of a lens surface changes its sign from positive to negative and vice versa. A critical point is a non-axial point on the lens surface where a tangential plane of the point is perpendicular to the optical axis.

According to the photographing optical lens assembly of the present disclosure, the image surface of the photographing optical lens assembly, based on the corresponding image sensor, can be a plane or a curved surface with an arbitrary curvature, especially a curved surface being concave facing towards the object side. Meanwhile, the photographing optical lens assembly of the present disclosure may optionally include one or more image correction components (such as a field flattener) between the image surface and the lens element closest to the image surface for the purpose of image corrections (such as field curvature correction). The optical properties of the image correction components such as curvatures, thicknesses, indices, positions and shapes (convex or concave, spherical or aspheric, diffractive surface and Fresnel surface, etc.) can be adjusted according to the requirement of the image capturing apparatus. Preferably, an image correction component may be a thin plano-concave component having a surface being concave toward the object side and be arranged near the image surface.

According to the photographing optical lens assembly of the present disclosure, the photographing optical lens assembly can include at least one stop, such as an aperture stop, a glare stop or a field stop, so as to favorably reduce the amount of stray light and thereby improve the image quality.

According to the photographing optical lens assembly of the present disclosure, the aperture stop can be configured as a front stop or a middle stop. The front stop disposed between an imaged object and the first lens element can provide a longer distance between the exit pupil and the image surface so that there is a telecentric effect for improving the image-sensing efficiency of an image sensor, such as a CCD or CMOS sensor. The middle stop disposed between the first lens element and the image surface is favorable for enlarging the field of view, thereby providing the photographing optical lens assembly with the advantage of a wide-angle lens.

An aperture control unit may be disposed in the photographing optical lens assembly of the present disclosure. The aperture control unit may be a mechanical part or a light moderation part, in which the size and shape of the aperture may be controlled by electricity or electronic signals. The mechanical part may include moving parts such as blades, shielding sheets, etc. The light moderation part may include shielding materials such as filters, electrochromic materials, liquid crystal layer, etc. The aperture control unit can control the amount of incoming light and exposure time so as to further strengthen the capability of image adjustment. Meanwhile, the aperture control unit may represent the aperture in the present disclosure that can adjust the image properties such as depth of field or exposure speed by changing the f-number of the lens assembly.

The photographing optical lens assembly of the present disclosure can be applied to a wide range of 3D (three-dimensional) image capturing applications and electronic devices, such as digital cameras, mobile devices, digital tablets, smart TVs, network surveillance devices, somatosensory game machines, driving recording systems, rear view camera systems, wearable devices and drone cameras.

The present disclosure further provides an image capturing apparatus including the aforementioned photographing optical lens assembly and an image sensor, wherein the image sensor is disposed on or near an image surface of the photographing optical lens assembly. By arranging the shape of the first lens element of the photographing optical lens assembly to have a reduced effective radius, the size of the whole photographing optical lens assembly can be reduced, which is favorable for minimizing the photographing optical lens assembly. Moreover, the image capturing apparatus can further include a barrel member, a holding member or a combination thereof.

The present disclosure further provides an electronic device including the aforementioned image capturing apparatus, the image capturing apparatus including the photographing optical lens assembly and an image sensor, wherein the image sensor is disposed on or near an image surface of the photographing optical lens assembly. Moreover, the electronic device can further include a control unit, a display unit, a storage unit, a random access memory (RAM) unit or a combination thereof.

According to the above descriptions of the present disclosure, the following 1st-9th specific embodiments are provided for further explanation.

1st Embodiment

Figure 1B:
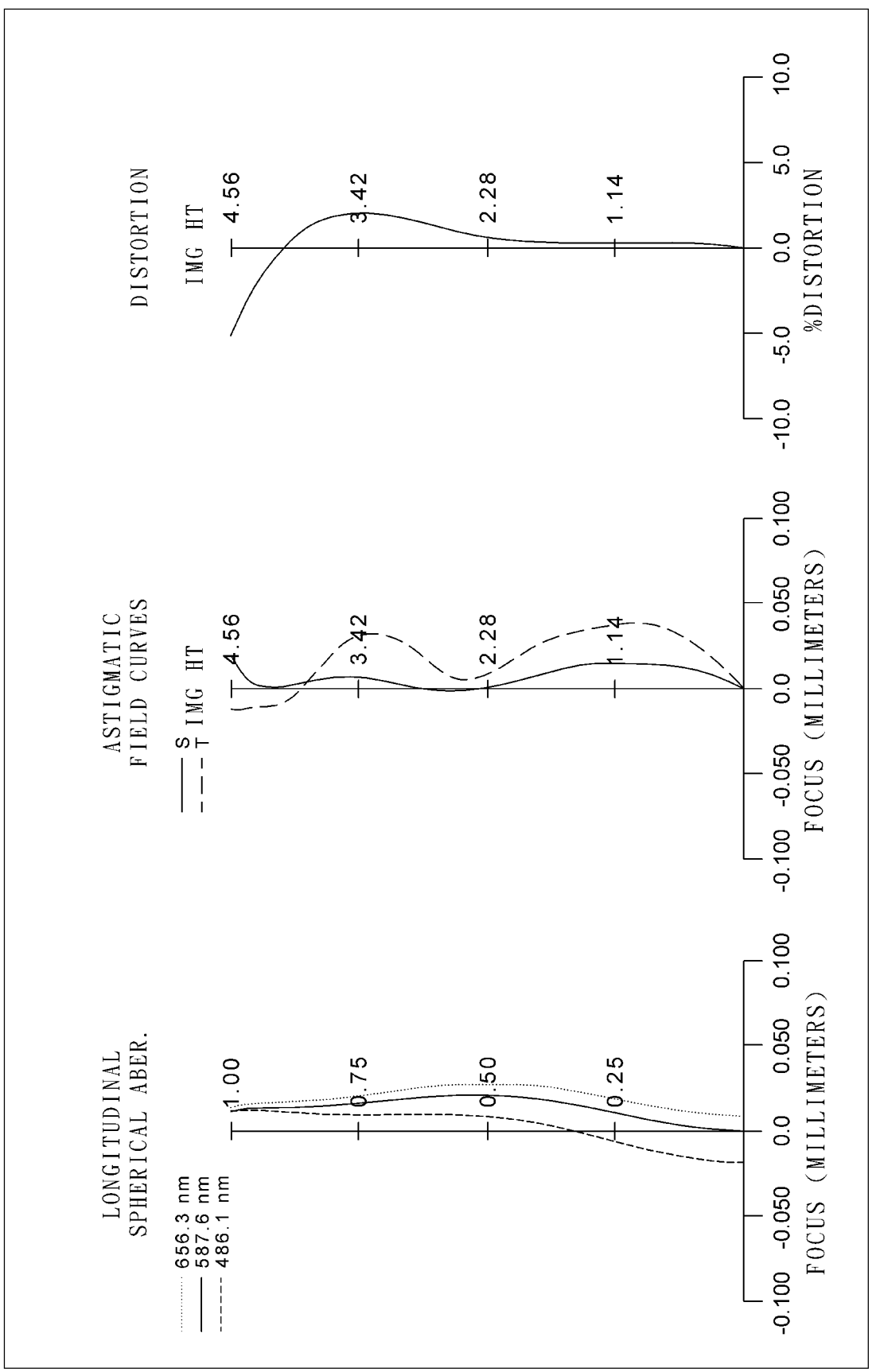
FIG. 1B shows longitudinal spherical aberration curves, astigmatic field curves and a distortion curve of the image capturing apparatus according to the 1st embodiment.

FIG. 1A is a schematic view of an image capturing apparatus according to the 1st embodiment of the present disclosure. FIG. 1B shows, in order from left to right, longitudinal spherical aberration curves, astigmatic field curves and a distortion curve of the image capturing apparatus according to the 1st embodiment.

In FIG. 1A, the image capturing apparatus includes a photographing optical lens assembly (not otherwise herein labeled) of the present disclosure and an image sensor 195. The photographing optical lens assembly includes, in order from an object side to an image side, a first lens element 110, a second lens element 120, an aperture stop 100, a third lens element 130, a stop 101, a fourth lens element 140, a fifth lens element 150, a sixth lens element 160, a seventh lens element 170, and an image surface 190. The image sensor 195 is disposed on or near the image surface 190, and the photographing optical lens assembly includes seven lens elements (110, 120, 130, 140, 150, 160 and 170) without any other lens element being inserted between them.

The first lens element 110 with negative refractive power has an object-side surface 111 being convex in a paraxial region thereof and an image-side surface 112 being concave in a paraxial region thereof. Both the object-side surface 111 and the image-side surface 112 are aspheric. The first lens element 110 is made of plastic material.

The second lens element 120 with positive refractive power has an object-side surface 121 being convex in a paraxial region thereof, and an image-side surface 122 being concave in a paraxial region thereof. Both the object-side surface 121 and the image-side surface 122 are aspheric. The second lens element 120 is made of plastic material.

The third lens element 130 with positive refractive power has an object-side surface 131 being convex in a paraxial region thereof, and an image-side surface 132 being convex in a paraxial region thereof. Both the object-side surface 131 and the image-side surface 132 are aspheric. The third lens element 130 is made of plastic material.

The fourth lens element 140 with negative refractive power has an object-side surface 141 being convex in a paraxial region thereof and having at least one concave critical point in an off-axis region thereof, and an image-side surface 142 being concave in a paraxial region thereof and having at least one convex critical point in an off-axis region thereof. Both the object-side surface 141 and the image-side surface 142 are aspheric. The fourth lens element 140 is made of plastic material.

The fifth lens element 150 with negative refractive power has an object-side surface 151 being concave in a paraxial region thereof, and an image-side surface 152 being concave in a paraxial region thereof. Both the object-side surface 151 and the image-side surface 152 are aspheric. The fifth lens element 150 is made of plastic material.

The sixth lens element 160 with positive refractive power has an object-side surface 161 being concave in a paraxial region thereof, and an image-side surface 162 being convex in a paraxial region thereof. Both the object-side surface 161 and the image-side surface 162 are aspheric. The sixth lens element 160 is made of plastic material.

The seventh lens element 170 with negative refractive power has an object-side surface 171 being convex in a paraxial region thereof and having at least one concave critical point in an off-axis region thereof, and an image-side surface 172 being concave in a paraxial region thereof and having at least one critical point in an off-axis region thereof. Both the object-side surface 171 and the image-side surface 172 are aspheric. The seventh lens element 170 is made of plastic material.

The photographing optical lens assembly further includes a filter 180 disposed between the seventh lens element 170 and the image surface 190. The filter 180 is made of glass material and does not affect a focal length of the photographing optical lens assembly.

The detailed optical data of the 1st embodiment are shown in TABLE 1, and the aspheric surface data are shown in TABLE 2, wherein the units of the curvature radius, the thickness and the focal length are expressed in mm, f is the focal length of the photographing optical lens assembly, Fno is an f-number of the photographing optical lens assembly, and HFOV is half of a maximal field of view, and surfaces #1 to #18 refer to the surfaces in order from the object side to the image side. The aspheric surface data are shown in TABLE 2 wherein k is the conic coefficient in the equation of the aspheric surface profiles, and A4-A20 refer to the 4th to 20th order aspheric coefficients.

Further, it should be noted that the tables shown in each of the following embodiments are associated with the schematic view and diagrams of longitudinal spherical aberration curves, astigmatic field curves and a distortion curve for the respective embodiment. Also, the definitions of the parameters presented in later tables are the same as those of the parameters presented in TABLE 1 and TABLE 2 for the 1st embodiment. Explanations in this regard will not be provided again.

TABLE 1

(1st Embodiment)

f = 3.48 mm, Fno = 2.43, HFOV = 54.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.078 | ASP | 0.332 | Plastic | 1.576 | 31.0 | −72.49 |
| 2 | | 2.754 | ASP | 0.191 | | | | |
| 3 | Lens 2 | 4.635 | ASP | 0.328 | Plastic | 1.669 | 19.4 | 29.43 |
| 4 | | 5.891 | ASP | 0.187 | | | | |
| 5 | Ape. Stop | Plano | | 0.068 | | | | |
| 6 | Lens 3 | 100.000 | ASP | 0.541 | Plastic | 1.544 | 56.0 | 4.10 |
| 7 | | −2.277 | ASP | −0.110 | | | | |
| 8 | Stop | Plano | | 0.140 | | | | |
| 9 | Lens 4 | 5.519 | ASP | 0.300 | Plastic | 1.669 | 19.4 | −12.75 |
| 10 | | 3.278 | ASP | 0.361 | | | | |
| 11 | Lens 5 | −15.583 | ASP | 0.340 | Plastic | 1.610 | 26.7 | −11.41 |
| 12 | | 12.680 | ASP | 0.231 | | | | |
| 13 | Lens 6 | −3.084 | ASP | 1.363 | Plastic | 1.544 | 56.0 | 2.38 |
| 14 | | −1.054 | ASP | 0.030 | | | | |
| 15 | Lens 7 | 2.016 | ASP | 0.724 | Plastic | 1.598 | 28.2 | −3.87 |
| 16 | | 0.932 | ASP | 1.200 | | | | |
| 17 | Filter | Plano | | 0.210 | Glass | 1.517 | 64.2 | — |
| 18 | | Plano | | 0.302 | | | | |
| 19 | Image Surface | Plano | | — | | | | |

*Reference wavelength is d-line 587.6 nm.
The effective radius on surface #8 (the stop) is 1.065 mm.

TABLE 2

Aspheric Coefficients

| Surface # | 1 | 2 | 3 | 4 | 6 | 7 | 9 |
|---|---|---|---|---|---|---|---|
| k = | 8.6147E−01 | 8.3960E−01 | −3.9680E+01 | 3.4448E+01 | −9.0000E+01 | 1.1463E+00 | −4.4770E+01 |
| A4 = | 5.6821E−03 | 1.0512E−03 | −1.0114E−02 | −7.2657E−02 | −2.2367E−02 | −6.0048E−02 | −8.6532E−02 |
| A6 = | 6.7750E−03 | −4.0137E−02 | −6.7858E−02 | −5.8531E−02 | −8.1844E−02 | −1.8384E−02 | −4.0018E−02 |
| A8 = | −3.5823E−02 | −9.4172E−03 | −1.8640E−02 | 6.4072E−02 | 6.9354E−02 | 6.9063E−02 | 5.8821E−02 |
| A10 = | 3.4380E−02 | −2.0074E−02 | 1.2124E−01 | 1.7388E−02 | −1.0923E−01 | −2.4532E−01 | −8.3668E−02 |
| A12 = | −2.0485E−02 | 2.4545E−02 | −9.2009E−02 | −3.5973E−02 | −1.8426E−02 | 2.9414E−01 | 7.1930E−02 |
| A14 = | 4.4974E−03 | −5.8126E−03 | 2.3840E−02 | −7.8046E−03 | 5.2832E−02 | −1.5402E−01 | −2.6705E−02 |
| A16 = | | | | | | | 1.4652E−03 |

| Surface # | 10 | 11 | 12 | 13 | 14 | 15 | 16 |
|---|---|---|---|---|---|---|---|
| k = | −1.1986E+01 | 8.7231E+01 | 1.8519E+01 | −2.5672E+00 | −3.6407E+00 | −8.3908E−01 | −3.7776E+00 |
| A4 = | −2.5113E−02 | −1.0270E−01 | −8.1072E−02 | 4.7424E−02 | −1.4933E−01 | −8.6707E−02 | −2.8934E−02 |
| A6 = | −4.9065E−02 | 7.7323E−02 | 1.8472E−02 | −6.5526E−02 | 1.3354E−01 | 2.9705E−02 | 1.1380E−02 |
| A8 = | 6.5774E−02 | −1.3516E−01 | 8.3572E−03 | 8.2096E−02 | −1.1265E−01 | −8.4545E−03 | −3.3804E−03 |
| A10 = | −5.5472E−02 | 1.7585E−01 | −3.1338E−02 | −3.7496E−02 | 7.0976E−02 | 1.5015E−03 | 6.4987E−04 |
| A12 = | 3.0975E−02 | −1.1165E−01 | 1.9287E−02 | −3.0153E−02 | −2.8761E−02 | −1.5140E−04 | −8.2089E−05 |
| A14 = | −1.0314E−02 | 3.4028E−02 | −4.1614E−03 | 3.9450E−02 | 7.1325E−03 | 5.3374E−06 | 6.7687E−06 |
| A16 = | 1.4530E−03 | −4.0009E−03 | 2.6979E−04 | −1.6650E−02 | −1.0011E−03 | 4.4738E−07 | −3.5150E−07 |
| A18 = | | | | 3.1894E−03 | 6.7522E−05 | −4.9661E−08 | 1.0441E−08 |
| A20 = | | | | −2.3615E−04 | −1.3534E−06 | 1.3536E−09 | −1.3508E−10 |

The equation of the aspheric surface profiles is expressed as follows:

$$X(Y) = (Y^2/R)/(1 + sqrt(1-(1+k)*(Y/R)^2)) + \sum_i (Ai)*(Y^i)$$

where:

X is the relative distance between a point on the aspheric surface spaced at a distance Y from the optical axis and the tangential plane at the aspheric surface vertex on the optical axis;

Y is the vertical distance from the point on the aspheric surface profile to the optical axis;

R is the curvature radius;

k is the conic coefficient; and

Ai is the i-th aspheric coefficient.

In the 1st embodiment, the focal length of the photographing optical lens assembly is f, the f-number of the photographing optical lens assembly is Fno, and half of the maximal field of view of the photographing optical lens assembly is HFOV.

These parameters have the following values: f=3.48 mm; Fno=2.43; and HFOV=54.0 degrees.

In the 1st embodiment, the Abbe number of the first lens element is V1, and the refractive index of the first lens element is N1. They satisfy the condition: V1/N1=19.70.

In the 1st embodiment, the Abbe number of the second lens element is V2, and the refractive index of the second lens element is N2. They satisfy the condition: V2/N2=11.65.

In the 1st embodiment, the Abbe number of the third lens element is V3, and the refractive index of the third lens element is N3. They satisfy the condition: V3/N3=36.26.

In the 1st embodiment, the Abbe number of the fourth lens element is V4, and the refractive index of the fourth lens element is N4. They satisfy the condition: V4/N4=11.65.

In the 1st embodiment, the Abbe number of the fifth lens element is V5, and the refractive index of the fifth lens element is N5. They satisfy the condition: V5/N5=16.61.

In the 1st embodiment, the Abbe number of the sixth lens element is V6, and the refractive index of the sixth lens element is N6. They satisfy the condition: V6/N6=36.26.

In the 1st embodiment, the Abbe number of the seventh lens element is V7, and the refractive index of the seventh lens element is N7. They satisfy the condition: V7/N7=17.65.

In the 1st embodiment, the Abbe number of the fourth lens element is V4, and the Abbe number of the fifth lens element is V5. They satisfy the condition: V4+V5=46.19.

In the 1st embodiment, the central thickness of the first lens element is CT1, and the central thickness of the sixth lens element is CT6. They satisfy the condition: CT6/CT1=4.11.

In the 1st embodiment, the central thickness of the first lens element is CT1, the central thickness of the second lens element is CT2, and the central thickness of the sixth lens element is CT6. They satisfy the condition: CT6/(CT1+CT2)=2.07.

In the 1st embodiment, the central thickness of the second lens element is CT2, and the central thickness of the sixth lens element is CT6. They satisfy the condition: CT6/CT2=4.16.

In the 1st embodiment, the central thickness of the third lens element is CT3, and the central thickness of the sixth lens element is CT6. They satisfy the condition: CT6/CT3=2.52.

In the 1st embodiment, the central thickness of the fourth lens element is CT4, and the central thickness of the sixth lens element is CT6. They satisfy the condition: CT6/CT4=4.54.

In the 1st embodiment, the central thickness of the fifth lens element is CT5, and the central thickness of the sixth lens element is CT6. They satisfy the condition: CT6/CT5=4.01.

In the 1st embodiment, the central thickness of the sixth lens element is CT6, and the central thickness of the seventh lens element is CT7. They satisfy the condition: CT6/CT7=1.88.

In the 1st embodiment, the sum of the central thicknesses of the seven lens elements is ΣCT, and the sum of axial distances between every two adjacent lens elements of the lens assembly is ΣAT. They satisfy the condition: ΣCT/ΣAT=3.58.

In the 1st embodiment, the curvature radius of the object-side surface of the third lens element is R5, and the curvature radius of the image-side surface of the third lens element is R6. They satisfy the condition: (R5+R6)/(R5−R6)=0.96.

In the 1st embodiment, the focal length of the photographing optical lens assembly is f, and the curvature radius of the image-side surface of the fourth lens element is R8. They satisfy the condition: f/R8=1.06.

In the 1st embodiment, the effective radius on the object-side surface of the first lens element is Y11, and the effective radius on the image-side surface of the seventh lens element is Y72. They satisfy the condition: Y11/Y72=0.35.

In the 1st embodiment, the maximum effective radius on the object-side surface of the seventh lens element is Y71, the maximum effective radius on the image-side surface of the sixth lens element is Y62, and the focal length of the photographing optical lens assembly is f They satisfy the condition: |Y71−Y62|/f=0.29.

In the 1st embodiment, the axial distance between the object-side surface of the first lens element and the image surface is TL, and the focal length of the photographing optical lens assembly is f They satisfy the condition: TL/f=1.94.

In the 1st embodiment, the axial distance between the object-side surface of the first lens element and the image surface is TL, the focal length of the photographing optical lens assembly is f, and half of the maximum field of view of the photographing optical lens assembly is HFOV. They satisfy the condition: TL/(f*sin(HFOV))=2.39.

In the 1st embodiment, the axial distance between the object-side surface of the first lens element and the image surface is TL, and the maximum image height of the photographing optical lens assembly is ImgH. They satisfy the condition: TL/ImgH=1.48.

In the 1st embodiment, the focal length of the photographing optical lens assembly is f, the focal length of the first lens focal length of the second lens element is f2. They satisfy the condition: |f/1|+f/f2=0.17.

In the 1st embodiment, the focal length of the photographing optical lens assembly is f, the focal length of the first lens element is f1, the focal length of the second lens element is f2, the focal length of the fourth lens element is f4, the focal length of the fifth lens element is f5, and the focal length of the sixth lens element is f6. They satisfy the condition: |f/f6|/(|f/f1|+|f/f2|+|f/f4|+|f/f5|)=1.97.

2nd Embodiment

Figure 2A:
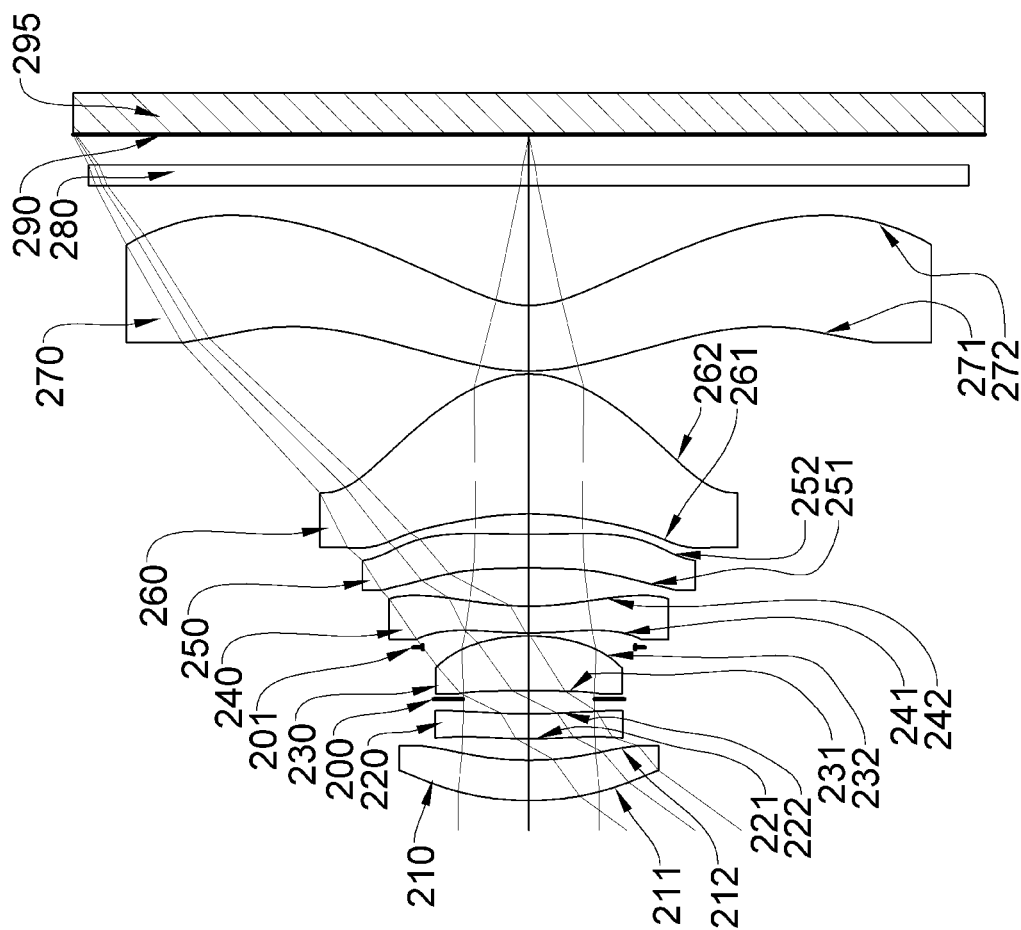
FIG. 2A is a schematic view of an image capturing apparatus according to the 2nd embodiment of the present disclosure.
Figure 2B:
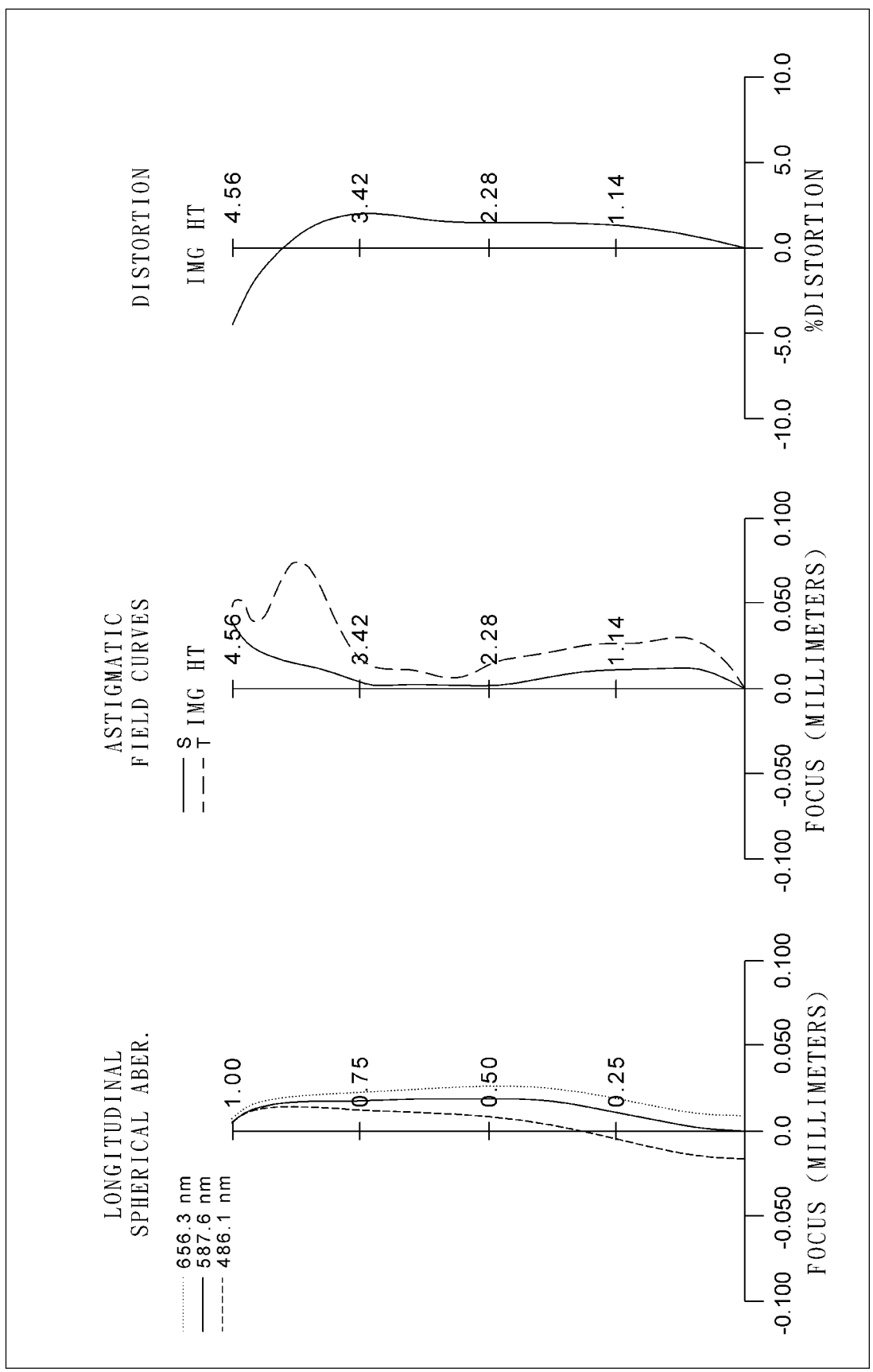
FIG. 2B shows longitudinal spherical aberration curves, astigmatic field curves and a distortion curve of the image capturing apparatus according to the 2nd embodiment.

FIG. 2A is a schematic view of an image capturing apparatus according to the 2nd embodiment of the present disclosure. FIG. 2B shows, in order from left to right, longitudinal spherical aberration curves, astigmatic field curves and a distortion curve of the image capturing apparatus according to the 2nd embodiment.

In FIG. 2A, the image capturing apparatus includes a photographing optical lens assembly (not otherwise herein labeled) of the present disclosure and an image sensor 295. The photographing optical lens assembly includes, in order from an object side to an image side, a first lens element 210, a second lens element 220, an aperture stop 200, a third lens element 230, a stop 201, a fourth lens element 240, a fifth lens element 250, a sixth lens element 260, a seventh lens element 270, and an image surface 290. The image sensor 295 is disposed on or near the image surface 290, and the photographing optical lens assembly includes seven lens elements (210, 220, 230, 240, 250, 260 and 270) without any other lens element being inserted between them.

The first lens element 210 with positive refractive power has an object-side surface 211 being convex in a paraxial region thereof, and an image-side surface 212 being concave in a paraxial region thereof. Both the object-side surface 211 and the image-side surface 212 are aspheric. The first lens element 210 is made of plastic material.

The second lens element 220 with positive refractive power has an object-side surface 221 being convex in a paraxial region thereof, and an image-side surface 222 being concave in a paraxial region thereof. Both the object-side surface 221 and the image-side surface 222 are aspheric. The second lens element 220 is made of plastic material.

The third lens element 230 with positive refractive power has an object-side surface 231 being concave in a paraxial region thereof, and an image-side surface 232 being convex in a paraxial region thereof. Both the object-side surface 231 and the image-side surface 232 are aspheric. The third lens element 230 is made of plastic material.

The fourth lens element 240 with negative refractive power has an object-side surface 241 being convex in a paraxial region thereof and having at least one concave critical point in an off-axis region thereof, and an image-side surface 242 being concave in a paraxial region thereof and having at least one convex critical point in an off-axis region thereof. Both the object-side surface 241 and the image-side surface 242 are aspheric. The fourth lens element 240 is made of plastic material.

The fifth lens element 250 with negative refractive power has an object-side surface 251 being concave in a paraxial region thereof, and an image-side surface 252 being concave in a paraxial region thereof. Both the object-side surface 251 and the image-side surface 252 are aspheric. The fifth lens element 250 is made of plastic material.

The sixth lens element 260 with positive refractive power has an object-side surface 261 being concave in a paraxial region thereof, and an image-side surface 262 being convex in a paraxial region thereof. Both the object-side surface 261 and the image-side surface 262 are aspheric. The sixth lens element 260 is made of plastic material.

The seventh lens element 270 with negative refractive power has an object-side surface 271 being convex in a paraxial region thereof and having at least one concave critical point in an off-axis region thereof, and an image-side surface 272 being concave in a paraxial region thereof and having at least one critical point in an off-axis region thereof. Both the object-side surface 271 and the image-side surface 272 are aspheric. The seventh lens element 270 is made of plastic material.

The photographing optical lens assembly further includes a filter 280 disposed between the seventh lens element 270 and the image surface 290. The filter 280 is made of glass material and does not affect a focal length of the photographing optical lens assembly.

The detailed optical data of the 2nd embodiment are shown in TABLE 3, and the aspheric surface data are shown in TABLE 4.

TABLE 3

(2nd Embodiment)

f = 3.44 mm Fno = 2.43 HFOV = 54.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.948 | ASP | 0.404 | Plastic | 1.614 | 26.0 | 93.75 |
| 2 | | 2.945 | ASP | 0.215 | | | | |
| 3 | Lens 2 | 5.169 | ASP | 0.250 | Plastic | 1.680 | 18.4 | 169.84 |
| 4 | | 5.306 | ASP | 0.150 | | | | |
| 5 | Ape. Stop | Plano | | 0.083 | | | | |
| 6 | Lens 3 | −23.252 | ASP | 0.550 | Plastic | 1.544 | 56.0 | 4.05 |
| 7 | | −2.030 | ASP | −0.113 | | | | |
| 8 | Stop | Plano | | 0.143 | | | | |
| 9 | Lens 4 | 4.036 | ASP | 0.269 | Plastic | 1.656 | 21.3 | −14.16 |
| 10 | | 2.739 | ASP | 0.383 | | | | |
| 11 | Lens 5 | −15.153 | ASP | 0.340 | Plastic | 1.607 | 26.6 | −11.29 |
| 12 | | 12.621 | ASP | 0.204 | | | | |
| 13 | Lens 6 | −3.062 | ASP | 1.405 | Plastic | 1.544 | 56.0 | 2.20 |
| 14 | | −0.999 | ASP | 0.030 | | | | |
| 15 | Lens 7 | 2.036 | ASP | 0.659 | Plastic | 1.607 | 26.6 | −3.50 |
| 16 | | 0.913 | ASP | 1.200 | | | | |
| 17 | Filter | Plano | | 0.210 | Glass | 1.517 | 64.2 | — |
| 18 | | Plano | | 0.306 | | | | |
| 19 | Image Surface | Plano | | — | | | | |

*Reference wavelength is d-line 587.6 nm.
The effective radius on surface #1 is 1.300 mm.
The effective radius on surface #8 (the stop) is 1.065 mm.

TABLE 4

Aspheric Coefficients

| Surface # | 1 | 2 | 3 | 4 | 6 | 7 | 9 |
|---|---|---|---|---|---|---|---|
| k = | 1.9878E+00 | 1.6612E+00 | −7.7319E+01 | 2.4713E+01 | 0.0000E+00 | 1.3922E+00 | −2.7783E+01 |
| A4 = | 7.7196E−03 | −1.1454E−02 | −1.9541E−02 | −8.8867E−02 | −2.5077E−02 | −3.7161E−02 | −7.7448E−02 |
| A6 = | −1.4746E−02 | −1.3680E−02 | −1.8147E−01 | −1.2580E−01 | −1.0276E−01 | −2.0904E−01 | −1.1353E−01 |
| A8 = | 1.5161E−02 | −8.7376E−02 | 1.6977E−01 | 2.8395E−01 | −1.0815E−01 | 6.1010E−01 | 1.5504E−01 |
| A10 = | −2.0472E−02 | 1.0601E−01 | 1.7992E−02 | −2.7622E−01 | 3.7670E−01 | −9.6026E−01 | −5.4283E−02 |
| A12 = | 1.1811E−02 | −5.2380E−02 | −7.1520E−02 | 2.0842E−01 | −1.0711E+00 | 7.5724E−01 | −8.7706E−02 |
| A14 = | −2.8645E−03 | 9.4951E−03 | 2.3326E−02 | −4.6328E−02 | 9.0740E−01 | −2.7226E−01 | 1.0278E−01 |
| A16 = | | | | | | | −3.3139E−02 |

| Surface # | 10 | 11 | 12 | 13 | 14 | 15 | 16 |
|---|---|---|---|---|---|---|---|
| k = | −1.1108E+01 | 8.3691E+01 | 2.7313E+01 | −2.6150E+00 | −3.2618E+00 | −7.7756E−01 | −3.7258E+00 |
| A4 = | −9.8519E−03 | −8.5821E−02 | −6.4356E−02 | 2.2392E−02 | −1.3911E−01 | −1.0070E−01 | −3.2431E−02 |
| A6 = | −1.0086E−01 | −2.3146E−02 | −2.8391E−02 | −2.3210E−02 | 9.8892E−02 | 4.3989E−02 | 1.3246E−02 |
| A8 = | 1.3643E−01 | 5.3431E−02 | 7.5317E−02 | 8.6241E−02 | −6.5358E−02 | −1.5441E−02 | −3.7648E−03 |
| A10 = | −1.0280E−01 | 5.3281E−03 | −8.5956E−02 | −1.0702E−01 | 3.8217E−02 | 3.5620E−03 | 6.6623E−04 |
| A12 = | 4.6118E−02 | −2.4278E−02 | 4.4620E−02 | 4.6136E−02 | −1.6076E−02 | −5.3593E−04 | −7.4163E−05 |
| A14 = | −1.1293E−02 | 9.9128E−03 | −1.0272E−02 | −1.4828E−03 | 4.4849E−03 | 5.1870E−05 | 5.1868E−06 |
| A16 = | 1.0328E−03 | −1.2906E−03 | 8.6160E−04 | −4.3157E−03 | −7.6522E−04 | −3.1016E−06 | −2.2133E−07 |
| A18 = | | | | 1.1825E−03 | 7.1349E−05 | 1.0408E−07 | 5.2804E−09 |
| A20 = | | | | −9.8338E−05 | −2.7850E−06 | −1.4986E−09 | −5.4231E−11 |

In the 2nd embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 2nd embodiment, so an explanation in this regard will not be provided again.

Moreover, these parameters can be calculated from TABLE 3 and TABLE 4 and satisfy the conditions stated in the table below.

| 2nd Embodiment | | | |
|---|---|---|---|
| f [mm] | 3.44 | CT6/CT3 | 2.55 |
| Fno | 2.43 | CT6/CT4 | 5.22 |
| HFOV [deg.] | 54.1 | CT6/CT5 | 4.13 |
| FOV [deg.] | 108.2 | CT6/CT7 | 2.13 |
| V1/N1 | 16.09 | ΣCT/ΣAT | 3.54 |
| V2/N2 | 10.95 | (R5 + R6)/(R5 − R6) | 1.19 |
| V3/N3 | 36.26 | f/R8 | 1.26 |
| V4/N4 | 12.84 | Y11/Y72 | 0.32 |
| V5/N5 | 16.57 | \|Y71-Y62\|/f | 0.40 |
| V6/N6 | 36.26 | Y72/f | 1.17 |
| V7/N7 | 16.57 | TL/f | 1.94 |
| V4 + V5 | 47.90 | TL/(f*sin(HFOV)) | 2.40 |
| CT6/CT1 | 3.48 | TL/ImgH | 1.47 |
| CT6/(CT1 + CT2) | 2.15 | \|f/f1\| + \|f/f2\| | 0.06 |
| CT6/CT2 | 5.62 | \|f/f6\|/(\|f/f1\| + \|f/f2\| + \|f/f4\| + \|f/f5\|) | 2.59 |

3rd Embodiment

Figure 3A:
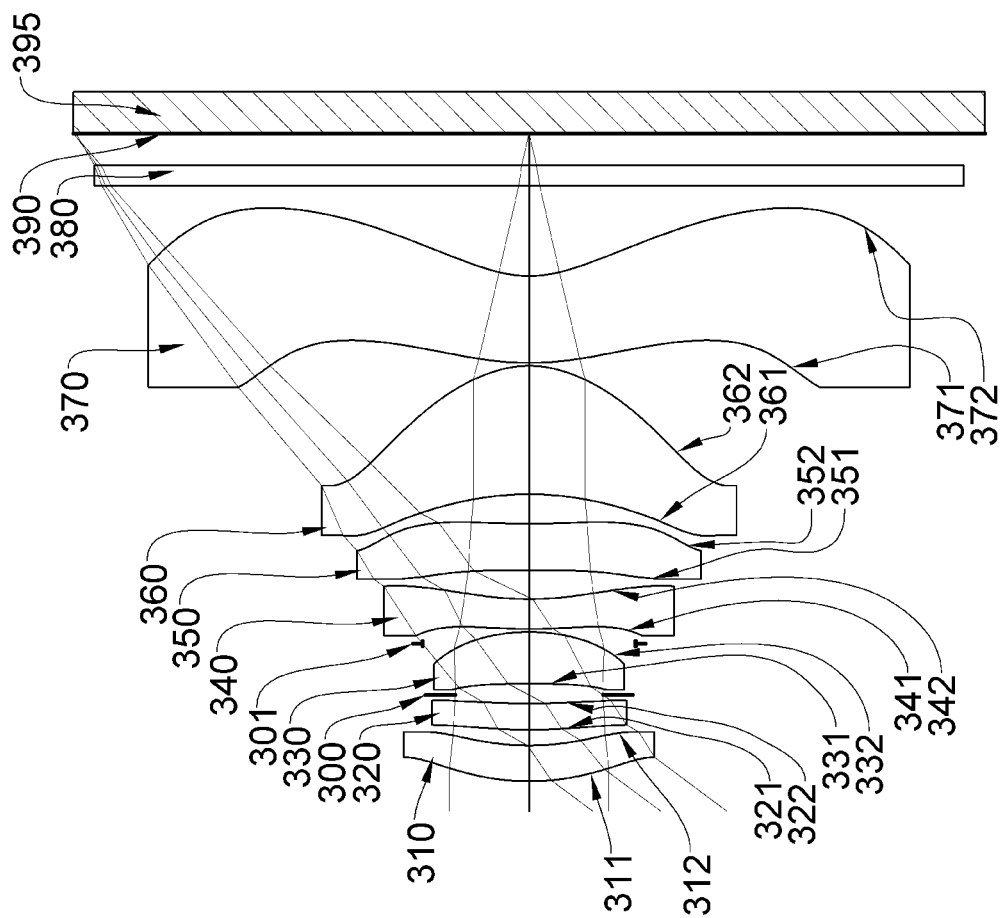
FIG. 3A is a schematic view of an image capturing apparatus according to the 3rd embodiment of the present disclosure.
Figure 3B:
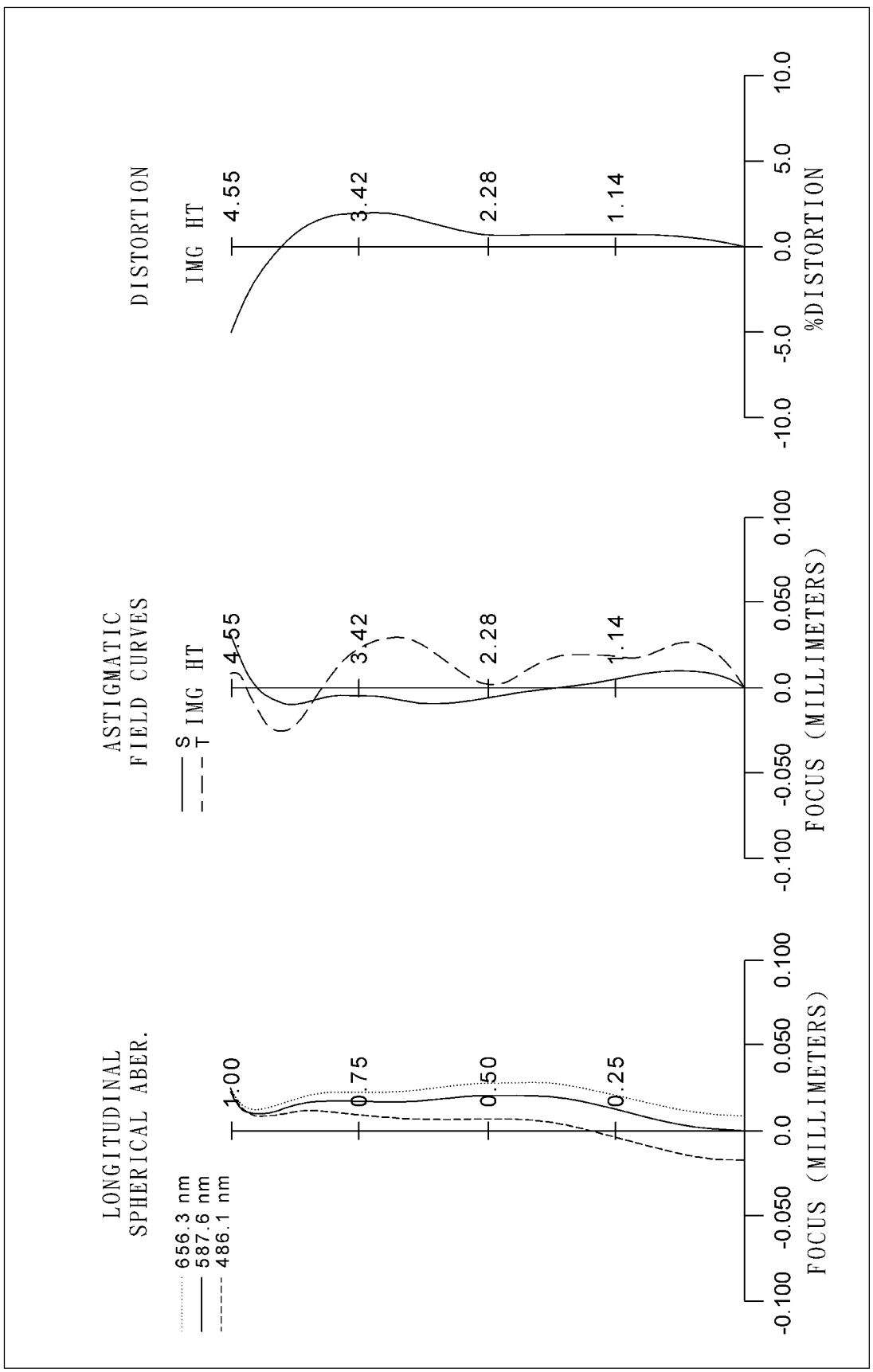
FIG. 3B shows longitudinal spherical aberration curves, astigmatic field curves and a distortion curve of the image capturing apparatus according to the 3rd embodiment.

FIG. 3A is a schematic view of an image capturing apparatus according to the 3rd embodiment of the present disclosure. FIG. 3B shows, in order from left to right, longitudinal spherical aberration curves, astigmatic field curves and a distortion curve of the image capturing apparatus according to the 3rd embodiment.

In FIG. 3A, the image capturing apparatus includes a photographing optical lens assembly (not otherwise herein labeled) of the present disclosure and an image sensor 395. The photographing optical lens assembly includes, in order from an object side to an image side, a first lens element 310, a second lens element 320, an aperture stop 300, a third lens element 330, a stop 301, a fourth lens element 340, a fifth lens element 350, a sixth lens element 360, a seventh lens element 370, and an image surface 390. The image sensor 395 is disposed on or near the image surface 390, and the photographing optical lens assembly includes seven lens elements (310, 320, 330, 340, 350, 360 and 370) without any other lens element being inserted between them.

The first lens element 310 with positive refractive power has an object-side surface 311 being convex in a paraxial region thereof, and an image-side surface 312 being concave in a paraxial region thereof. Both the object-side surface 311 and the image-side surface 312 are aspheric. The first lens element 310 is made of plastic material.

The second lens element 320 with positive refractive power has an object-side surface 321 being convex in a paraxial region thereof, and an image-side surface 322 being concave in a paraxial region thereof. Both the object-side surface 321 and the image-side surface 322 are aspheric. The second lens element 320 is made of plastic material.

The third lens element 330 with positive refractive power has an object-side surface 331 being concave in a paraxial region thereof, and an image-side surface 332 being convex in a paraxial region thereof. Both the object-side surface 331 and the image-side surface 332 are aspheric. The third lens element 330 is made of plastic material.

The fourth lens element 340 with negative refractive power has an object-side surface 341 being convex in a paraxial region thereof and having at least one concave critical point in an off-axis region thereof, and an image-side surface 342 being concave in a paraxial region thereof and having at least one convex critical point in an off-axis region thereof. Both the object-side surface 341 and the image-side surface 342 are aspheric. The fourth lens element 340 is made of plastic material.

The fifth lens element 350 with negative refractive power has an object-side surface 351 being convex in a paraxial region thereof, and an image-side surface 352 being concave in a paraxial region thereof. Both the object-side surface 351 and the image-side surface 352 are aspheric. The fifth lens element 350 is made of plastic material.

The sixth lens element 360 with positive refractive power has an object-side surface 361 being concave in a paraxial region thereof, and an image-side surface 362 being convex in a paraxial region thereof. Both the object-side surface 361 and the image-side surface 362 are aspheric. The sixth lens element 360 is made of plastic material.

The seventh lens element 370 with negative refractive power has an object-side surface 371 being convex in a paraxial region thereof and having at least one concave critical point in an off-axis region thereof, and an image-side surface 372 being concave in a paraxial region thereof and having at least one critical point in an off-axis region thereof.

Both the object-side surface 371 and the image-side surface 372 are aspheric. The seventh lens element 370 is made of plastic material.

The photographing optical lens assembly further includes a filter 380 disposed between the seventh lens element 370 and the image surface 390. The filter 380 is made of glass material and does not affect the focal length of the photographing optical lens assembly.

The detailed optical data of the 3rd embodiment are shown in TABLE 5, and the aspheric surface data are shown in TABLE 6.

TABLE 5

(3rd Embodiment)

f = 3.56 mm, Fno = 2.23, HFOV = 53.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.392 | ASP | 0.358 | Plastic | 1.545 | 56.1 | 41.99 |
| 2 | | 2.530 | ASP | 0.157 | | | | |
| 3 | Lens 2 | 4.935 | ASP | 0.263 | Plastic | 1.669 | 19.4 | 22.67 |
| 4 | | 7.160 | ASP | 0.086 | | | | |
| 5 | Ape. Stop | Plano | | 0.113 | | | | |
| 6 | Lens 3 | −10.841 | ASP | 0.518 | Plastic | 1.544 | 55.9 | 4.41 |
| 7 | | −1.996 | ASP | −0.117 | | | | |
| 8 | Stop | Plano | | 0.147 | | | | |
| 9 | Lens 4 | 5.209 | ASP | 0.300 | Plastic | 1.669 | 19.4 | −10.56 |
| 10 | | 2.929 | ASP | 0.286 | | | | |
| 11 | Lens 5 | 29.199 | ASP | 0.468 | Plastic | 1.598 | 29.2 | −13.43 |
| 12 | | 6.263 | ASP | 0.298 | | | | |
| 13 | Lens 6 | −3.004 | ASP | 1.286 | Plastic | 1.544 | 55.9 | 2.53 |
| 14 | | −1.086 | ASP | 0.030 | | | | |
| 15 | Lens 7 | 2.760 | ASP | 0.871 | Plastic | 1.617 | 24.9 | −3.86 |
| 16 | | 1.124 | ASP | 0.900 | | | | |
| 17 | Filter | Plano | | 0.210 | Glass | 1.517 | 64.2 | — |
| 18 | | Plano | | 0.317 | | | | |
| 19 | Image Surface | Plano | | — | | | | |

*Reference wavelength is d-line 587.6 nm.
The effective radius on surface #8 (the stop) is 1.065 mm.

TABLE 6

Aspheric Coefficients

| Surface # | 1 | 2 | 3 | 4 | 6 | 7 | 9 |
|---|---|---|---|---|---|---|---|
| k = | −1.0062E+00 | −7.4245E−01 | −2.2211E+01 | 6.2842E+01 | −6.4201E+00 | 6.2244E−01 | −2.0615E+01 |
| A4 = | 8.2438E−03 | −8.8256E−03 | −3.0586E−02 | −6.2785E−02 | −4.8704E−02 | −4.6713E−02 | −7.2688E−02 |
| A6 = | −2.0641E−02 | −6.1025E−02 | 9.9260E−03 | −5.7709E−02 | −1.2191E−01 | −4.8963E−02 | −2.5130E−02 |
| A8 = | 1.0801E−02 | 5.4286E−02 | −1.5952E−01 | 1.4266E−03 | 3.2862E−01 | 6.8309E−02 | −4.7808E−02 |
| A10 = | −1.1982E−02 | −1.2120E−01 | 3.6160E−01 | 3.5189E−01 | −9.4174E−01 | −1.5679E−01 | 1.2204E−01 |
| A12 = | −3.2742E−03 | 9.1926E−02 | −3.3517E−01 | −6.4007E−01 | 1.3657E+00 | 1.9939E−01 | −1.1989E−01 |
| A14 = | 2.9656E−03 | −2.0587E−02 | 1.2041E−01 | 3.5426E−01 | −7.7564E−01 | −1.0685E−01 | 5.1694E−02 |
| A16 = | | | | | | | −7.1640E−03 |

| Surface # | 10 | 11 | 12 | 13 | 14 | 15 | 16 |
|---|---|---|---|---|---|---|---|
| k = | −7.9023E+00 | 7.2311E+01 | −8.1003E+00 | −1.4133E+00 | −3.2500E+00 | −6.4339E−01 | −4.1609E+00 |
| A4 = | −3.5725E−02 | −1.3653E−01 | −1.0952E−01 | 7.0592E−03 | −1.2899E−01 | −6.3887E−02 | −3.0878E−02 |
| A6 = | 1.5861E−02 | 1.3137E−01 | 6.4224E−02 | −1.0524E−03 | 8.8476E−02 | 1.7265E−02 | 1.0648E−02 |
| A8 = | −5.4684E−02 | −1.6305E−01 | −4.4581E−02 | −3.0786E−02 | −6.0088E−02 | −4.7670E−03 | −3.1060E−03 |
| A10 = | 7.6151E−02 | 1.7242E−01 | 2.1710E−02 | 7.8229E−02 | 3.0368E−02 | 9.0456E−04 | 6.2585E−04 |
| A12 = | −5.0937E−02 | −9.7913E−02 | −9.0912E−03 | −8.1924E−02 | −1.0149E−02 | −9.0816E−05 | −8.2780E−05 |
| A14 = | 1.6856E−02 | 2.7336E−02 | 2.5597E−03 | 4.3757E−02 | 2.2874E−03 | −1.6403E−06 | 6.9434E−06 |
| A16 = | −2.2368E−03 | −3.0011E−03 | −2.8465E−04 | −1.2568E−02 | −3.1668E−04 | 1.3551E−06 | −3.5394E−07 |
| A18 = | | | | 1.8593E−03 | 2.2095E−05 | −1.1543E−07 | 9.9645E−09 |
| A20 = | | | | −1.1176E−04 | −4.9876E−07 | 3.0984E−09 | −1.1823E−10 |

In the 3rd embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 3rd embodiment, so an explanation in this regard will not be provided again.

Moreover, these parameters can be calculated from TABLE 5 and TABLE 6 and satisfy the conditions stated in the table below.

| 3rd Embodiment | | | |
|---|---|---|---|
| f [mm] | 3.56 | CT6/CT3 | 2.48 |
| Fno | 2.23 | CT6/CT4 | 4.29 |
| HFOV [deg.] | 53.4 | CT6/CT5 | 2.75 |
| FOV [deg.] | 106.8 | CT6/CT7 | 1.48 |
| V1/N1 | 36.30 | ΣCT/ΣAT | 4.06 |
| V2/N2 | 11.62 | (R5 + R6)/(R5 − R6) | 1.45 |
| V3/N3 | 36.20 | f/R8 | 1.21 |
| V4/N4 | 11.62 | Y11/Y72 | 0.33 |
| V5/N5 | 18.27 | |Y71−Y62|/f | 0.23 |
| V6/N6 | 36.20 | Y72/f | 1.07 |
| V7/N7 | 15.42 | TL/f | 1.82 |
| V4 + V5 | 48.60 | TL/(f*sin(HFOV)) | 2.27 |
| CT6/CT1 | 3.59 | TL/ImgH | 1.42 |
| CT6/(CT1 + CT2) | 2.07 | |f/f1| + |f/f2| | 0.24 |
| CT6/CT2 | 4.89 | |f/f6|/(|f/f1| + |f/f2| + |f/f4| + |f/f5|) | 1.67 |

4th Embodiment

Figure 4A:
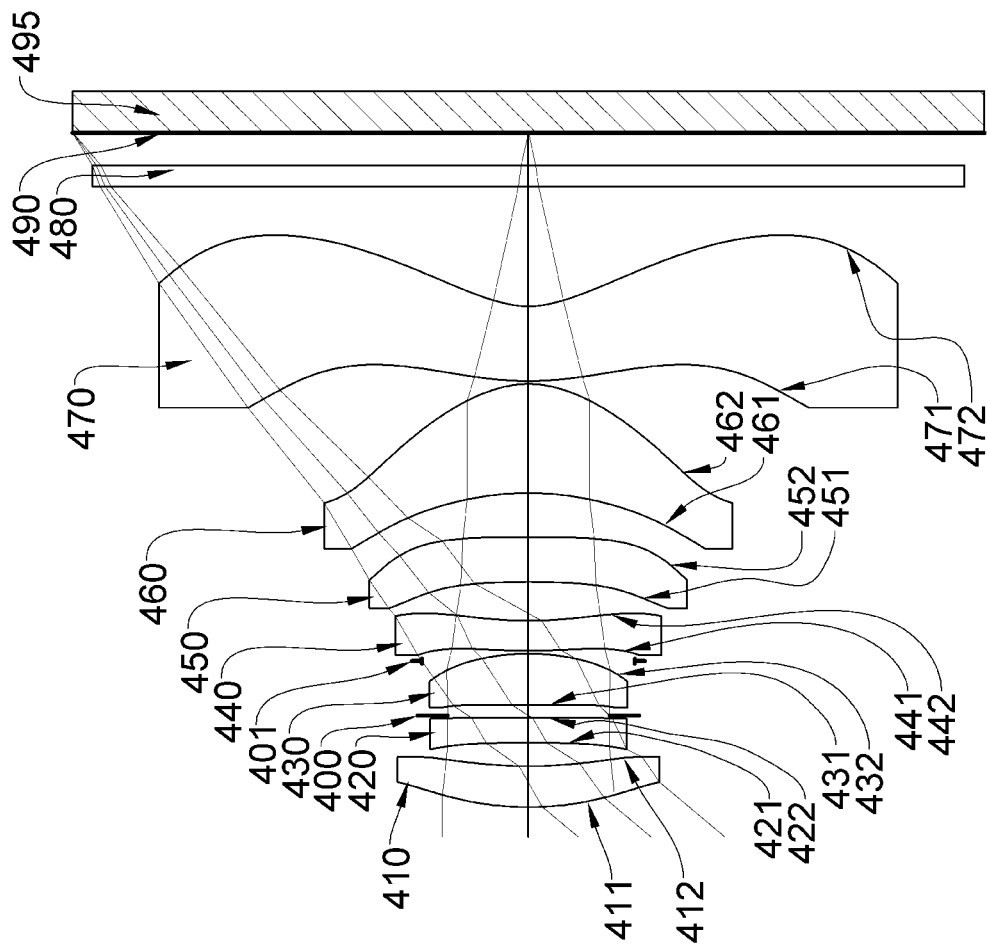
FIG. 4A is a schematic view of an image capturing apparatus according to the 4th embodiment of the present disclosure.
Figure 4B:
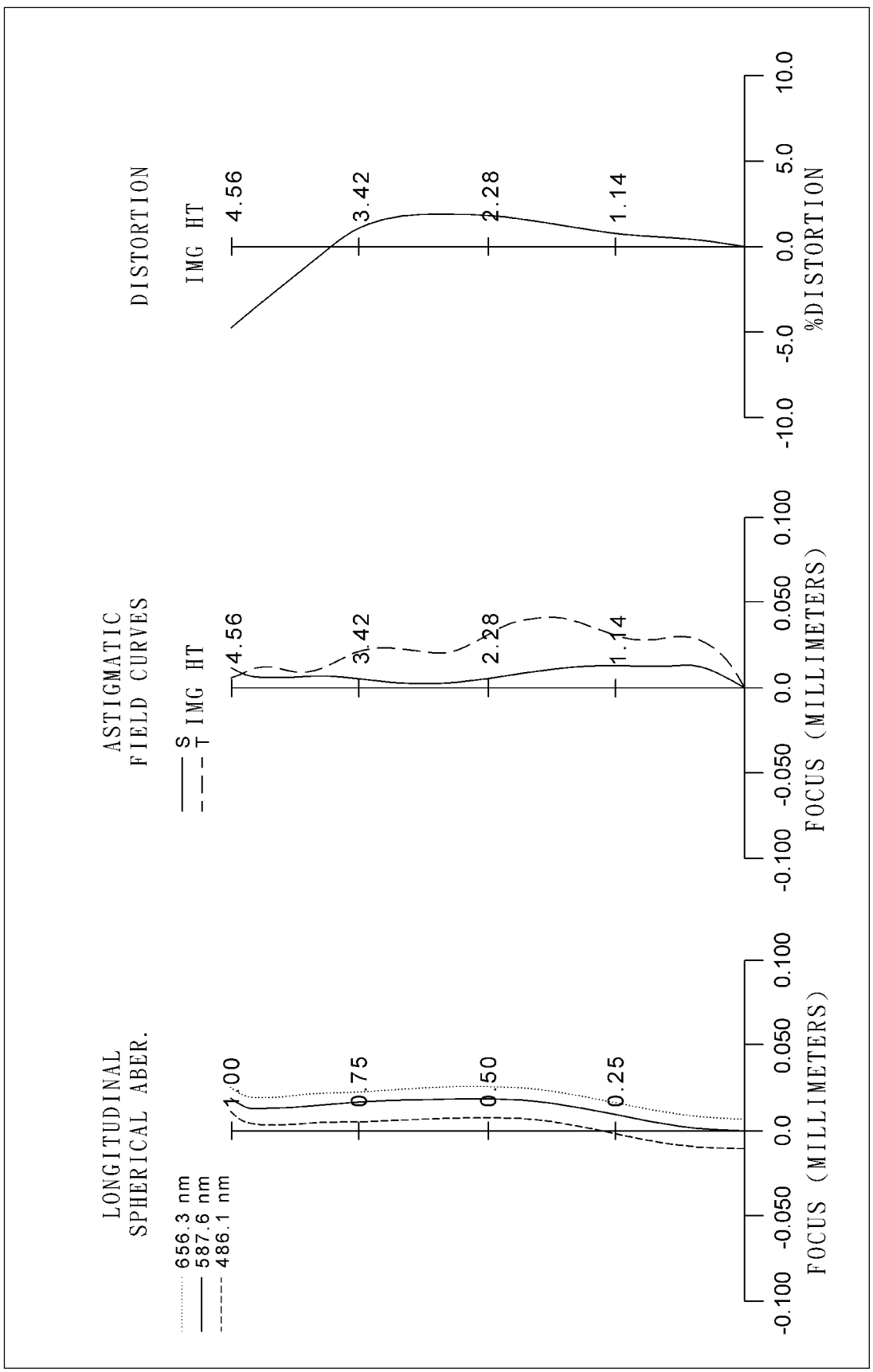
FIG. 4B shows longitudinal spherical aberration curves, astigmatic field curves and a distortion curve of the image capturing apparatus according to the 4th embodiment.

FIG. 4A is a schematic view of an image capturing apparatus according to the 4th embodiment of the present disclosure. FIG. 4B shows, in order from left to right, longitudinal spherical aberration curves, astigmatic field curves and a distortion curve of the image capturing apparatus according to the 4th embodiment.

In FIG. 4A, the image capturing apparatus includes a photographing optical lens assembly (not otherwise herein labeled) of the present disclosure and an image sensor 495. The photographing optical lens assembly includes, in order from an object side to an image side, a first lens element 410, a second lens element 420, an aperture stop 400, a third lens element 430, a stop 401, a fourth lens element 440, a fifth lens element 450, a sixth lens element 460, a seventh lens element 470, and an image surface 490. The image sensor 495 is disposed on or near the image surface 490, and the photographing optical lens assembly includes seven lens elements (410, 420, 430, 440, 450, 460 and 470) without any other lens element being inserted between them.

The first lens element 410 with positive refractive power has an object-side surface 411 being convex in a paraxial region thereof, and an image-side surface 412 being concave in a paraxial region thereof. Both the object-side surface 411 and the image-side surface 412 are aspheric. The first lens element 410 is made of plastic material.

The second lens element 420 with negative refractive power has an object-side surface 421 being concave in a paraxial region thereof, and an image-side surface 422 being concave in a paraxial region thereof. Both the object-side surface 421 and the image-side surface 422 are aspheric. The second lens element 420 is made of plastic material.

The third lens element 430 with positive refractive power has an object-side surface 431 being convex in a paraxial region thereof, and an image-side surface 432 being convex in a paraxial region thereof. Both the object-side surface 431 and the image-side surface 432 are aspheric. The third lens element 430 is made of plastic material.

The fourth lens element 440 with negative refractive power has an object-side surface 441 being convex in a paraxial region thereof and having at least one concave critical point in an off-axis region thereof, and an image-side surface 442 being concave in a paraxial region thereof and having at least one convex critical point in an off-axis region thereof. Both the object-side surface 441 and the image-side surface 442 are aspheric. The fourth lens element 440 is made of plastic material.

The fifth lens element 450 with negative refractive power has an object-side surface 451 being concave in a paraxial region thereof, and an image-side surface 452 being convex in a paraxial region thereof. Both the object-side surface 451 and the image-side surface 452 are aspheric. The fifth lens element 450 is made of plastic material.

The sixth lens element 460 with positive refractive power has an object-side surface 461 being concave in a paraxial region thereof, and an image-side surface 462 being convex in a paraxial region thereof. Both the object-side surface 461 and the image-side surface 462 are aspheric. The sixth lens element 460 is made of plastic material.

The seventh lens element 470 with negative refractive power has an object-side surface 471 being convex in a paraxial region thereof and having at least one concave critical point in an off-axis region thereof, an image-side surface 472 being concave in a paraxial region thereof and having at least one critical point in an off-axis region thereof. Both the object-side surface 471 and the image-side surface 472 are aspheric. The seventh lens element 470 is made of plastic material.

The photographing optical lens assembly further includes a filter 480 disposed between the seventh lens element 470 and the image surface 490. The filter 480 is made of glass material and does not affect a focal length of the photographing optical lens assembly.

The detailed optical data of the 4th embodiment are shown in TABLE 7, and the aspheric surface data are shown in TABLE 8.

TABLE 7

(4th Embodiment)

f = 4.00 mm, Fno = 2.33, HFOV = 50.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.028 | ASP | 0.409 | Plastic | 1.614 | 26.0 | 14.74 |
| 2 | | 4.317 | ASP | 0.233 | | | | |
| 3 | Lens 2 | −100.000 | ASP | 0.250 | Plastic | 1.669 | 19.4 | −16.65 |
| 4 | | 12.552 | ASP | 0.026 | | | | |
| 5 | Ape. Stop | Plano | | 0.104 | | | | |

TABLE 7-continued (4th Embodiment)

f = 4.00 mm, Fno = 2.33, HFOV = 50.0 deg.

| Surface # | | Curvature Radius | | Thickness | Material | Index | Abbe # | Focal Length |
|---|---|---|---|---|---|---|---|---|
| 6 | Lens 3 | 33.136 | ASP | 0.513 | Plastic | 1.544 | 56.0 | 4.07 |
| 7 | | −2.361 | ASP | −0.074 | | | | |
| 8 | Stop | Plano | | 0.104 | | | | |
| 9 | Lens 4 | 5.908 | ASP | 0.300 | Plastic | 1.669 | 19.4 | −12.51 |
| 10 | | 3.393 | ASP | 0.389 | | | | |
| 11 | Lens 5 | −12.685 | ASP | 0.448 | Plastic | 1.566 | 37.4 | −25.71 |
| 12 | | −100.000 | ASP | 0.443 | | | | |
| 13 | Lens 6 | −2.981 | ASP | 1.092 | Plastic | 1.544 | 56.0 | 2.37 |
| 14 | | −1.015 | ASP | 0.030 | | | | |
| 15 | Lens 7 | 3.070 | ASP | 0.749 | Plastic | 1.566 | 37.4 | −2.82 |
| 16 | | 0.958 | ASP | 1.200 | | | | |
| 17 | Filter | Plano | | 0.210 | Glass | 1.517 | 64.2 | — |
| 18 | | Plano | | 0.326 | | | | |
| 19 | Image Surface | Plano | | — | | | | |

*Reference wavelength is d-line 587.6 nm.
The effective radius on surface #8 (the stop) is 1.065 mm.

TABLE 8

Aspheric Coefficients

| Surface # | 1 | 2 | 3 | 4 | 6 | 7 | 9 |
|---|---|---|---|---|---|---|---|
| k = | 1.0807E+00 | 6.1762E+00 | −9.0000E+01 | 8.0917E+01 | −9.0000E+01 | −1.1256E+00 | −8.7129E+00 |
| A4 = | −5.5976E−03 | −2.0175E−02 | −8.3123E−02 | −9.1613E−02 | −2.4402E−02 | −8.7048E−03 | −7.9481E−02 |
| A6 = | 2.6535E−04 | −2.1343E−02 | 1.3976E−02 | 1.4465E−02 | −8.1821E−02 | −1.1996E−01 | −1.4121E−02 |
| A8 = | −1.0346E−02 | 1.7076E−02 | −4.7589E−04 | −3.9225E−02 | 9.5342E−02 | 1.6360E−01 | −8.0872E−03 |
| A10 = | 9.2550E−03 | −3.7667E−02 | 1.9595E−02 | 1.9814E−01 | −1.5270E−01 | −2.0377E−01 | 4.7559E−02 |
| A12 = | −6.9737E−03 | 2.5487E−02 | −1.2336E−02 | −2.3542E−01 | 1.6705E−01 | 1.4263E−01 | −6.4736E−02 |
| A14 = | 1.7885E−03 | −5.1691E−03 | 1.2094E−03 | 1.0406E−01 | −9.0039E−02 | −5.0352E−02 | 3.6694E−02 |
| A16 = | | | | | | | −8.1995E−03 |

| Surface # | 10 | 11 | 12 | 13 | 14 | 15 | 16 |
|---|---|---|---|---|---|---|---|
| k = | −1.5977E+01 | 5.5855E+01 | 9.0000E+01 | −2.5029E−01 | −3.7896E+00 | −5.8377E−01 | −4.3207E+00 |
| A4 = | −4.7145E−02 | −7.4459E−02 | −6.9436E−02 | −6.2243E−03 | −1.3543E−01 | −5.8867E−02 | −2.1415E−02 |
| A6 = | 2.8886E−02 | 2.2905E−02 | 2.9485E−02 | 3.1355E−02 | 1.2055E−01 | 1.2249E−02 | 4.7873E−03 |
| A8 = | −7.2390E−02 | −2.7117E−02 | −3.2482E−02 | −5.5807E−02 | −9.9746E−02 | −3.1298E−03 | −1.1893E−03 |
| A10 = | 9.3243E−02 | 2.2045E−02 | 1.9258E−02 | 6.3835E−02 | 6.0437E−02 | 5.1349E−04 | 2.3534E−04 |
| A12 = | −6.8438E−02 | −1.4114E−02 | −9.2330E−03 | −4.6397E−02 | −2.4319E−02 | −1.1529E−05 | −3.3030E−05 |
| A14 = | 2.7570E−02 | 8.8539E−03 | 2.7792E−03 | 1.9883E−02 | 6.2584E−03 | −1.3263E−05 | 3.0784E−06 |
| A16 = | −4.7268E−03 | −2.1810E−03 | −3.2022E−04 | −4.7743E−03 | −9.4820E−04 | 2.5735E−06 | −1.8191E−07 |
| A18 = | | | | 5.8844E−04 | 7.2711E−05 | −1.9818E−07 | 6.1917E−09 |
| A20 = | | | | −2.8720E−05 | −1.9445E−06 | 5.6109E−09 | −9.2317E−11 |

In the 4th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 4th embodiment, so an explanation in this regard will not be provided again.

Moreover, these parameters can be calculated from TABLE 7 and TABLE 8 and satisfy the conditions stated in the table below.

| 4th Embodiment | | | |
|---|---|---|---|
| f [mm] | 4.00 | CT6/CT3 | 2.13 |
| Fno | 2.33 | CT6/CT4 | 3.64 |
| HFOV [deg.] | 50.0 | CT6/CT5 | 2.44 |
| FOV [deg.] | 100.0 | CT6/CT7 | 1.46 |
| V1/N1 | 16.09 | ΣCT/ΣAT | 3.00 |
| V2/N2 | 11.65 | (R5 + R6)/(R5 − R6) | 0.87 |
| V3/N3 | 36.26 | f/R8 | 1.18 |
| V4/N4 | 11.65 | Y11/Y72 | 0.35 |
| V5/N5 | 23.91 | |Y71−Y62|/f | 0.19 |
| V6/N6 | 36.26 | Y72/f | 0.92 |
| V7/N7 | 23.91 | TL/f | 1.69 |
| V4 + V5 | 56.88 | TL/(f*sin(HFOV)) | 2.20 |
| CT6/CT1 | 2.67 | TL/ImgH | 1.48 |
| CT6/(CT1 + CT2) | 1.66 | |f/f1| + |f/f2| | 0.51 |
| CT6/CT2 | 4.37 | |f/f6|/(|f/f1| + |f/f2| + |f/f4| + |f/f5|) | 1.71 |

5th Embodiment

Figure 5A:
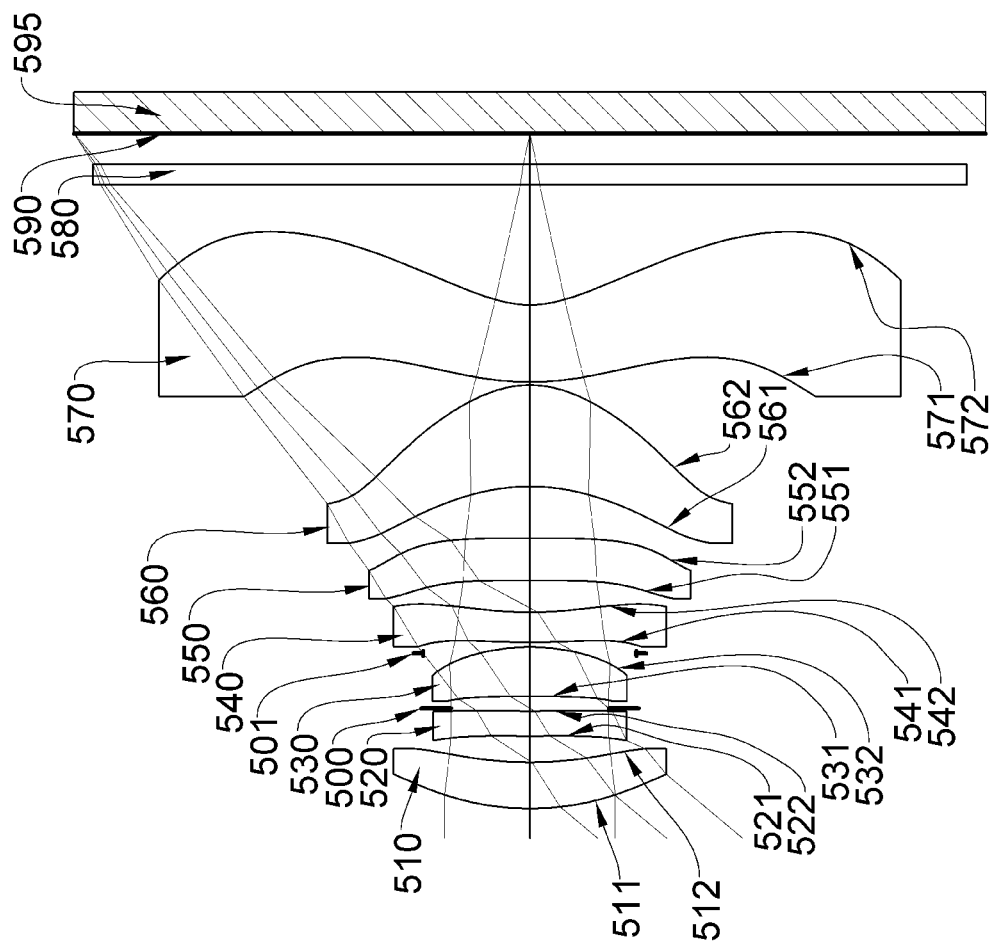
FIG. 5A is a schematic view of an image capturing apparatus according to the 5th embodiment of the present disclosure.
Figure 5B:
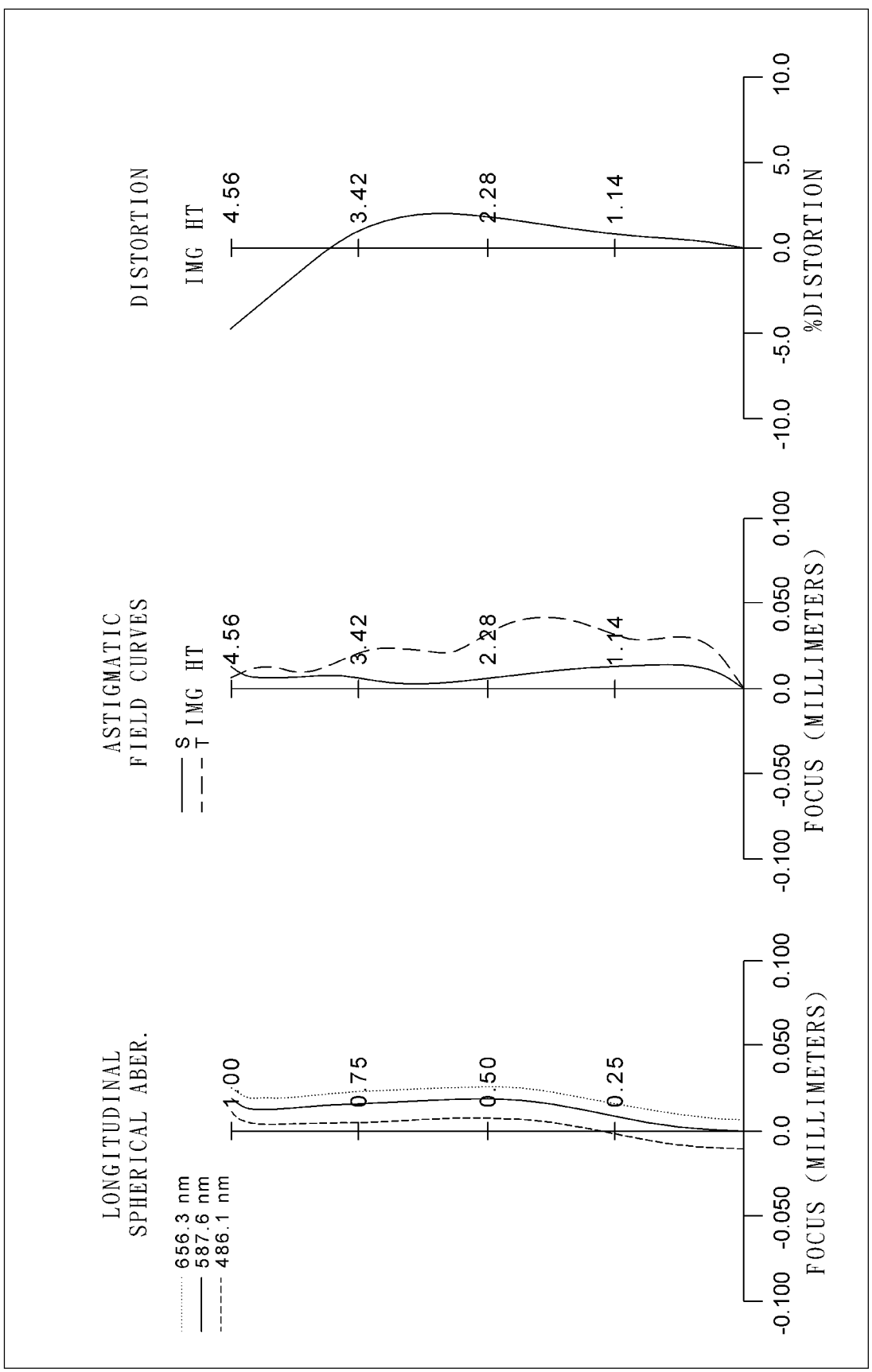
FIG. 5B shows longitudinal spherical aberration curves, astigmatic field curves and a distortion curve of the image capturing apparatus according to the 5th embodiment.

FIG. 5A is a schematic view of an image capturing apparatus according to the 5th embodiment of the present disclosure. FIG. 5B shows, in order from left to right, longitudinal spherical aberration curves, astigmatic field curves and a distortion curve of the image capturing apparatus according to the 5th embodiment.

In FIG. 5A, the image capturing apparatus includes a photographing optical lens assembly (not otherwise herein labeled) of the present disclosure and an image sensor 595. The photographing optical lens assembly includes, in order from an object side to an image side, a first lens element 510, a second lens element 520, an aperture stop 500, a third lens element 530, a stop 501, a fourth lens element 540, a fifth lens element 550, a sixth lens element 560, a seventh lens element 570, and an image surface 590. The image sensor 595 is disposed on or near the image surface 590, and the photographing optical lens assembly includes seven lens elements (510, 520, 530, 540, 550, 560 and 570) without any other lens element being inserted between them.

The first lens element 510 with positive refractive power has an object-side surface 511 being convex in a paraxial region thereof, and an image-side surface 512 being concave in a paraxial region thereof. Both the object-side surface 511 and the image-side surface 512 are aspheric. The first lens element 510 is made of plastic material.

The second lens element 520 with negative refractive power has an object-side surface 521 being convex in a paraxial region thereof, and an image-side surface 522 being concave in a paraxial region thereof. Both the object-side surface 521 and the image-side surface 522 are aspheric. The second lens element 520 is made of plastic material.

The third lens element 530 with positive refractive power has an object-side surface 531 being concave in a paraxial region thereof, and an image-side surface 532 being convex in a paraxial region thereof. Both the object-side surface 531 and the image-side surface 532 are aspheric. The third lens element 530 is made of plastic material.

The fourth lens element 540 with negative refractive power has an object-side surface 541 being convex in a paraxial region thereof and having at least one concave critical point in an off-axis region thereof, and an image-side surface 542 being concave in a paraxial region thereof and having at least one convex critical point in an off-axis region thereof. Both the object-side surface 541 and the image-side surface 542 are aspheric. The fourth lens element 540 is made of plastic material.

The fifth lens element 550 with positive refractive power has an object-side surface 551 being convex in a paraxial region thereof, and an image-side surface 552 being convex in a paraxial region thereof. Both the object-side surface 551 and the image-side surface 552 are aspheric. The fifth lens element 550 is made of plastic material.

The sixth lens element 560 with positive refractive power has an object-side surface 561 being concave in a paraxial region thereof, and an image-side surface 562 being convex in a paraxial region thereof. Both the object-side surface 561 and the image-side surface 562 are aspheric. The sixth lens element 560 is made of plastic material.

The seventh lens element 570 with negative refractive power has an object-side surface 571 being convex in a paraxial region thereof and having at least one concave critical point in an off-axis region thereof, and an image-side surface 572 being concave in a paraxial region thereof and having at least one critical point in an off-axis region thereof. Both the object-side surface 571 and the image-side surface 572 are aspheric. The seventh lens element 570 is made of plastic material.

The photographing optical lens assembly further includes a filter 580 disposed between the seventh lens element 570 and the image surface 590. The filter 580 is made of glass material and does not affect the focal length of the photographing optical lens assembly.

The detailed optical data of the 5th embodiment are shown in TABLE 9, and the aspheric surface data are shown in TABLE 10.

TABLE 9

(5th Embodiment)

f= 3.98 mm, Fno = 2.33, HFOV = 50.0 deg.

| Surface # | | Curvature Radius | Thickness | | Material | Index | Abbe # | Focal Length |
|---|---|---|---|---|---|---|---|---|
| 0 | Object | Plano | Infinity | | | | | |
| 1 | Lens 1 | 2.712 | ASP | 0.462 | Plastic | 1.582 | 30.2 | 15.85 |
| 2 | | 3.601 | ASP | 0.262 | | | | |
| 3 | Lens 2 | 27.317 | ASP | 0.250 | Plastic | 1.669 | 19.4 | −27.77 |
| 4 | | 11.017 | ASP | 0.029 | | | | |
| 5 | Ape. Stop | Plano | | 0.118 | | | | |
| 6 | Lens 3 | −28.151 | ASP | 0.493 | Plastic | 1.544 | 56.0 | 4.32 |
| 7 | | −2.181 | ASP | −0.064 | | | | |
| 8 | Stop | Plano | | 0.112 | | | | |
| 9 | Lens 4 | 6.785 | ASP | 0.300 | Plastic | 1.669 | 19.4 | −10.00 |
| 10 | | 3.310 | ASP | 0.318 | | | | |
| 11 | Lens 5 | 100.000 | ASP | 0.424 | Plastic | 1.582 | 30.2 | 133.13 |
| 12 | | −344.737 | ASP | 0.518 | | | | |
| 13 | Lens 6 | −2.057 | ASP | 1.016 | Plastic | 1.544 | 56.0 | 2.64 |
| 14 | | −0.993 | ASP | 0.030 | | | | |
| 15 | Lens 7 | 2.766 | ASP | 0.771 | Plastic | 1.582 | 30.2 | −3.26 |
| 16 | | 1.011 | ASP | 1.200 | | | | |
| 17 | Filter | Plano | | 0.210 | Glass | 1.517 | 64.2 | — |
| 18 | | Plano | | 0.303 | | | | |
| 19 | Image Surface | Plano | | — | | | | |

*Reference wavelength is d-line 587.6 nm.
The effective radius on surface #8 (the stop) is 1.065 mm.

TABLE 10

Aspheric Coefficients

| Surface # | 1 | 2 | 3 | 4 | 6 | 7 | 9 |
|---|---|---|---|---|---|---|---|
| k = | 1.3439E+00 | 5.5638E+00 | −8.9152E+01 | 5.3616E+01 | −8.2116E+01 | −1.0883E+00 | 4.3325E+00 |
| A4 = | −7.1406E−03 | −2.6002E−02 | −8.8618E−02 | −9.4455E−02 | −3.9000E−02 | −1.0117E−02 | −8.2210E−02 |
| A6 = | −1.2584E−03 | −1.6753E−02 | 1.5789E−02 | 1.9847E−02 | −6.0053E−02 | −9.5912E−02 | 2.5071E−02 |
| A8 = | −3.7076E−03 | 1.0834E−02 | −1.3578E−02 | −3.8965E−02 | 6.3099E−02 | 9.9942E−02 | −7.8016E−02 |
| A10 = | 2.2748E−03 | −2.7934E−02 | 4.1760E−02 | 1.7213E−01 | −1.2535E−01 | −1.2959E−01 | 1.1147E−01 |
| A12 = | −2.1163E−03 | 1.8491E−02 | −3.3640E−02 | −2.1291E−01 | 1.4003E−01 | 9.5521E−02 | −9.8685E−02 |
| A14 = | 4.9494E−04 | −4.3349E−03 | 9.0816E−03 | 9.9290E−02 | −8.4345E−02 | −3.9248E−02 | 4.5871E−02 |
| A16 = | | | | | | | −8.7761E−03 |

| Surface # | 10 | 11 | 12 | 13 | 14 | 15 | 16 |
|---|---|---|---|---|---|---|---|
| k = | −1.7024E+01 | −9.0000E+01 | 9.0000E+01 | −1.5785E+00 | −3.3860E+00 | −6.6543E−01 | −4.6360E+00 |
| A4 = | −4.8432E−02 | −7.1104E−02 | −5.3774E−02 | −1.1418E−02 | −1.2699E−01 | −4.1341E−02 | −1.0235E−02 |
| A6 = | 4.2250E−02 | 6.3988E−03 | 1.5142E−02 | 6.5824E−02 | 1.0493E−01 | −4.7248E−04 | −5.1214E−04 |
| A8 = | −7.0203E−02 | 2.7551E−03 | −2.3477E−02 | −1.3988E−01 | −9.0310E−02 | 3.0064E−03 | 4.0181E−04 |
| A10 = | 6.6580E−02 | −1.7544E−02 | 1.7313E−02 | 1.7497E−01 | 5.8512E−02 | −1.4730E−03 | −8.6301E−05 |
| A12 = | −3.7925E−02 | 2.0008E−02 | −9.7051E−03 | −1.3398E−01 | −2.5769E−02 | 4.1239E−04 | 1.0757E−05 |
| A14 = | 1.2114E−02 | −7.3081E−03 | 3.3712E−03 | 6.2750E−02 | 7.5248E−03 | −7.1759E−05 | −8.5613E−07 |
| A16 = | −1.6959E−03 | 8.6306E−04 | −4.3832E−04 | −1.7346E−02 | −1.3383E−03 | 7.5177E−06 | 4.0947E−08 |
| A18 = | | | | 2.5962E−03 | 1.2713E−04 | −4.2844E−07 | −1.0077E−09 |
| A20 = | | | | −1.6264E−04 | −4.8426E−06 | 1.0125E−08 | 8.7946E−12 |

In the 5th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 5th embodiment, so an explanation in this regard will not be provided again.

Moreover, these parameters can be calculated from TABLE 9 and TABLE 10 and satisfy the conditions stated in the table below.

| 5th Embodiment | | | |
|---|---|---|---|
| f [mm] | 3.98 | CT6/CT3 | 2.06 |
| Fno | 2.33 | CT6/CT4 | 3.39 |
| HFOV [deg.] | 50.0 | CT6/CT5 | 2.40 |
| FOV [deg.] | 100.0 | CT6/CT7 | 1.32 |
| V1/N1 | 19.11 | ΣCT/ΣAT | 2.81 |
| V2/N2 | 11.65 | (R5 + R6)/(R5 − R6) | 1.17 |
| V3/N3 | 36.26 | f/R8 | 1.20 |
| V4/N4 | 11.65 | Y11/Y72 | 0.37 |
| V5/N5 | 19.11 | \|Y71−Y62\|/f | 0.21 |
| V6/N6 | 36.26 | Y72/f | 0.93 |
| V7/N7 | 19.11 | TL/f | 1.70 |
| V4 + V5 | 49.68 | TL/(f*sin(HFOV)) | 2.22 |
| CT6/CT1 | 2.20 | TL/ImgH | 1.48 |
| CT6/(CT1 + CT2) | 1.43 | \|f/f1\| + \|f/f2\| | 0.39 |
| CT6/CT2 | 4.06 | \|f/f6\|/(\|f/f1\| + \|f/f2\| + \|f/f4\| + \|f/f5\|) | 1.83 |

6th Embodiment

Figure 6A:
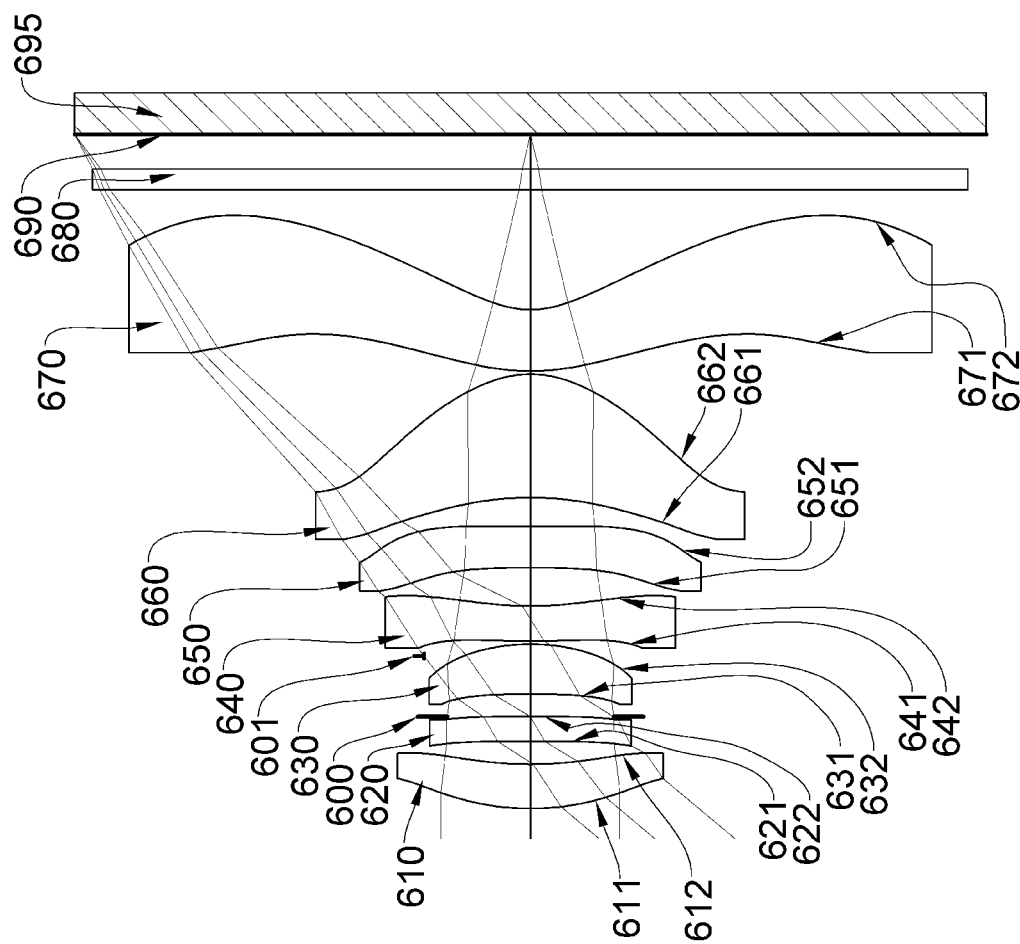
FIG. 6A is a schematic view of an image capturing apparatus according to the 6th embodiment of the present disclosure.
Figure 6B:
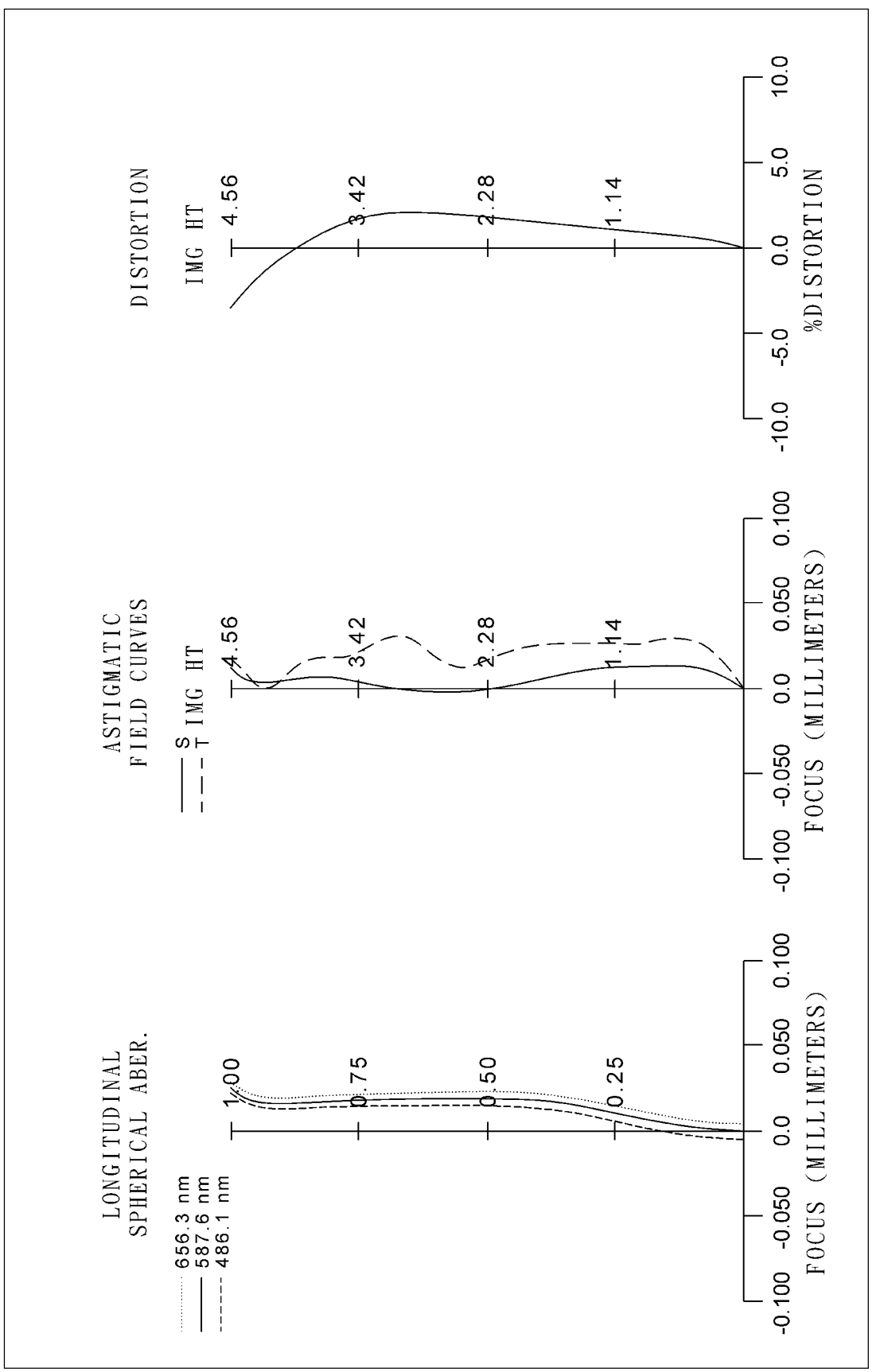
FIG. 6B shows longitudinal spherical aberration curves, astigmatic field curves and a distortion curve of the image capturing apparatus according to the 6th embodiment.

FIG. 6A is a schematic view of an image capturing apparatus according to the 6th embodiment of the present disclosure. FIG. 6B shows, in order from left to right, longitudinal spherical aberration curves, astigmatic field curves and a distortion curve of the image capturing apparatus according to the 6th embodiment.

In FIG. 6A, the image capturing apparatus includes a photographing optical lens assembly (not otherwise herein labeled) of the present disclosure and an image sensor 695. The photographing optical lens assembly includes, in order from an object side to an image side, a first lens element 610, a second lens element 620, an aperture stop 600, a third lens element 630, a stop 601, a fourth lens element 640, a fifth lens element 650, a sixth lens element 660, a seventh lens element 670, and an image surface 690. The image sensor 695 is disposed on or near the image surface 690, and the photographing optical lens assembly includes seven lens elements (610, 620, 630, 640, 650, 660 and 670) without any other lens element being inserted between them.

The first lens element 610 with positive refractive power has an object-side surface 611 being convex in a paraxial region thereof, and an image-side surface 612 being concave in a paraxial region thereof. Both the object-side surface 611 and the image-side surface 612 are aspheric. The first lens element 610 is made of plastic material.

The second lens element 620 with positive refractive power has an object-side surface 621 being convex in a paraxial region thereof, and an image-side surface 622 being convex in a paraxial region thereof. Both the object-side surface 621 and the image-side surface 622 are aspheric. The second lens element 620 is made of plastic material.

The third lens element 630 with positive refractive power has an object-side surface 631 being concave in a paraxial region thereof, and an image-side surface 632 being convex in a paraxial region thereof. Both the object-side surface 631 and the image-side surface 632 are aspheric. The third lens element 630 is made of plastic material.

The fourth lens element 640 with negative refractive power has an object-side surface 641 being convex in a paraxial region thereof and having at least one concave critical point in an off-axis region thereof, and an image-side surface 642 being concave in a paraxial region thereof and having at least one convex critical point in an off-axis region thereof. Both the object-side surface 641 and the image-side surface 642 are aspheric. The fourth lens element 640 is made of plastic material.

The fifth lens element 650 with negative refractive power has an object-side surface 651 being concave in a paraxial region thereof, and an image-side surface 652 being concave in a paraxial region thereof. Both the object-side surface 651 and the image-side surface 652 are aspheric. The fifth lens element 650 is made of plastic material.

The sixth lens element 660 with positive refractive power has an object-side surface 661 being concave in a paraxial region thereof, and an image-side surface 662 being convex in a paraxial region thereof. Both the object-side surface 661 and the image-side surface 662 are aspheric. The sixth lens element 660 is made of plastic material.

The sixth lens element 670 with negative refractive power has an object-side surface 671 being convex in a paraxial region thereof and having at least one concave critical point in an off-axis region thereof, and an image-side surface 672 being concave in a paraxial region thereof and having at least one critical point in an off-axis region thereof. Both the object-side surface 671 and the image-side surface 672 are aspheric. The seventh lens element 670 is made of plastic material.

The photographing optical lens assembly further includes a filter 680 disposed between the seventh lens element 670 and the image surface 690. The filter 680 is made of glass material and does not affect a focal length of the photographing optical lens assembly.

The detailed optical data of the 6th embodiment are shown in TABLE 11, and the aspheric surface data are shown in TABLE 12.

TABLE 11

(6th Embodiment)

f = 3.95 mm, Fno = 2.20, HFOV = 50.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.539 | ASP | 0.443 | Plastic | 1.545 | 56.0 | 13.42 |
| 2 | | 3.653 | ASP | 0.229 | | | | |
| 3 | Lens 2 | 96.578 | ASP | 0.250 | Plastic | 1.669 | 19.4 | 79.67 |
| 4 | | −118.860 | ASP | −0.002 | | | | |
| 5 | Ape. Stop | Plano | | 0.227 | | | | |
| 6 | Lens 3 | −10.400 | ASP | 0.499 | Plastic | 1.544 | 55.9 | 4.76 |
| 7 | | −2.106 | ASP | −0.118 | | | | |
| 8 | Stop | Plano | | 0.148 | | | | |
| 9 | Lens 4 | 7.956 | ASP | 0.352 | Plastic | 1.660 | 20.4 | −8.16 |
| 10 | | 3.155 | ASP | 0.384 | | | | |
| 11 | Lens 5 | −21.102 | ASP | 0.414 | Plastic | 1.582 | 30.2 | −15.28 |
| 12 | | 15.506 | ASP | 0.289 | | | | |
| 13 | Lens 6 | −3.327 | ASP | 1.237 | Plastic | 1.544 | 55.9 | 2.22 |
| 14 | | −1.000 | ASP | 0.030 | | | | |
| 15 | Lens 7 | 2.143 | ASP | 0.614 | Plastic | 1.582 | 30.2 | −3.01 |
| 16 | | 0.863 | ASP | 1.200 | | | | |
| 17 | Filter | Plano | | 0.210 | Glass | 1.517 | 64.2 | — |
| 18 | | Plano | | 0.346 | | | | |
| 19 | Image Surface | Plano | | — | | | | |

*Reference wavelength is d-line 587.6 nm.
The effective radius on surface #8 (the stop) is 1.065 mm.

TABLE 12

Aspheric Coefficients

| Surface # | 1 | 2 | 3 | 4 | 6 | 7 | 9 |
|---|---|---|---|---|---|---|---|
| k = | 7.3593E−01 | 6.7602E+00 | −4.8621E+01 | 9.0000E+01 | 4.3980E+01 | −5.9131E−01 | −1.7516E+00 |
| A4 = | −6.8847E−03 | −3.1956E−02 | −6.2672E−02 | −6.5709E−02 | −5.3429E−02 | −3.8109E−02 | −9.7230E−02 |
| A6 = | −7.4203E−03 | −3.4447E−02 | 1.7305E−02 | 1.0775E−02 | −5.0548E−02 | −2.7005E−02 | 5.2222E−02 |
| A8 = | 1.4988E−03 | 3.7368E−02 | −3.0362E−02 | 1.8125E−02 | 6.3820E−02 | −7.9827E−03 | −1.0298E−01 |
| A10 = | −2.7879E−03 | −7.3305E−02 | 5.9222E−02 | 6.8514E−03 | −1.4412E−01 | −1.5840E−02 | 1.1945E−01 |
| A12 = | −1.3604E−03 | 5.3562E−02 | −4.0071E−02 | −1.6657E−02 | 1.4502E−01 | 2.2074E−02 | −9.5045E−02 |
| A14 = | 6.4370E−04 | −1.4527E−02 | 9.3454E−03 | 5.5544E−03 | −8.6545E−02 | −1.6698E−02 | 4.1191E−02 |
| A16 = | | | | | | | −7.2247E−03 |

| Surface # | 10 | 11 | 12 | 13 | 14 | 15 | 16 |
|---|---|---|---|---|---|---|---|
| k = | −1.0847E+01 | 5.9874E+01 | 4.5532E+01 | −1.3883E+00 | −3.7013E+00 | −7.4474E−01 | −3.7462E+00 |
| A4 = | −5.6134E−02 | −9.3749E−02 | −9.8369E−02 | −2.7770E−02 | −1.2790E−01 | −8.7621E−02 | −2.2396E−02 |
| A6 = | 4.1770E−02 | 6.4667E−02 | 7.6824E−02 | 3.5108E−02 | 9.1319E−02 | 3.1987E−02 | 7.3185E−03 |
| A8 = | −4.7002E−02 | −8.6934E−02 | −6.3380E−02 | −2.2238E−02 | −6.4558E−02 | −1.0410E−02 | −1.9734E−03 |
| A10 = | 3.6080E−02 | 7.1609E−02 | 3.3212E−02 | 3.6586E−02 | 3.6722E−02 | 2.3155E−03 | 3.4620E−04 |
| A12 = | −1.7483E−02 | −2.7194E−02 | −1.3452E−02 | −4.1202E−02 | −1.4240E−02 | −3.4475E−04 | −3.8876E−05 |
| A14 = | 4.9531E−03 | 4.8482E−03 | 3.4022E−03 | 2.2663E−02 | 3.6961E−03 | 3.3801E−05 | 2.7642E−06 |
| A16 = | −6.3844E−04 | −3.3808E−04 | −3.4219E−04 | −6.4811E−03 | −6.0356E−04 | −2.0856E−06 | −1.2060E−07 |
| A18 = | | | | 9.4120E−04 | 5.4927E−05 | 7.3171E−08 | 2.9618E−09 |
| A20 = | | | | −5.5306E−05 | −2.1047E−06 | −1.1120E−09 | −3.1601E−11 |

In the 6th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 6th embodiment, so an explanation in this regard will not be provided again.

Moreover, these parameters can be calculated from TABLE 11 and TABLE 12 and satisfy the conditions stated in the table below.

| 6th Embodiment | | | |
|---|---|---|---|
| f [mm] | 3.95 | CT6/CT3 | 2.48 |
| Fno | 2.20 | CT6/CT4 | 3.51 |
| HFOV [deg.] | 50.0 | CT6/CT5 | 2.99 |
| FOV [deg.] | 100.0 | CT6/CT7 | 2.01 |
| V1/N1 | 36.27 | ΣCT/ΣAT | 3.21 |
| V2/N2 | 11.65 | (R5 + R6)/(R5 − R6) | 1.51 |
| V3/N3 | 36.23 | f/R8 | 1.25 |
| V4/N4 | 12.29 | Y11/Y72 | 0.33 |
| V5/N5 | 19.11 | \|Y71-Y62\|/f | 0.32 |
| V6/N6 | 36.23 | Y72/f | 1.02 |
| V7/N7 | 19.11 | TL/f | 1.71 |
| V4 + V5 | 50.64 | TL/(f*sin(HFOV)) | 2.23 |
| CT6/CT1 | 2.79 | TL/ImgH | 1.48 |
| CT6/(CT1 + CT2) | 1.78 | \|f/f1\| + \|f/f2\| | 0.34 |
| CT6/CT2 | 4.95 | \|f/f6\|/(\|f/f1\| + \|f/f2\| + \|f/f4\| + \|f/f5\|) | 1.64 |

7th Embodiment

Figure 7A:
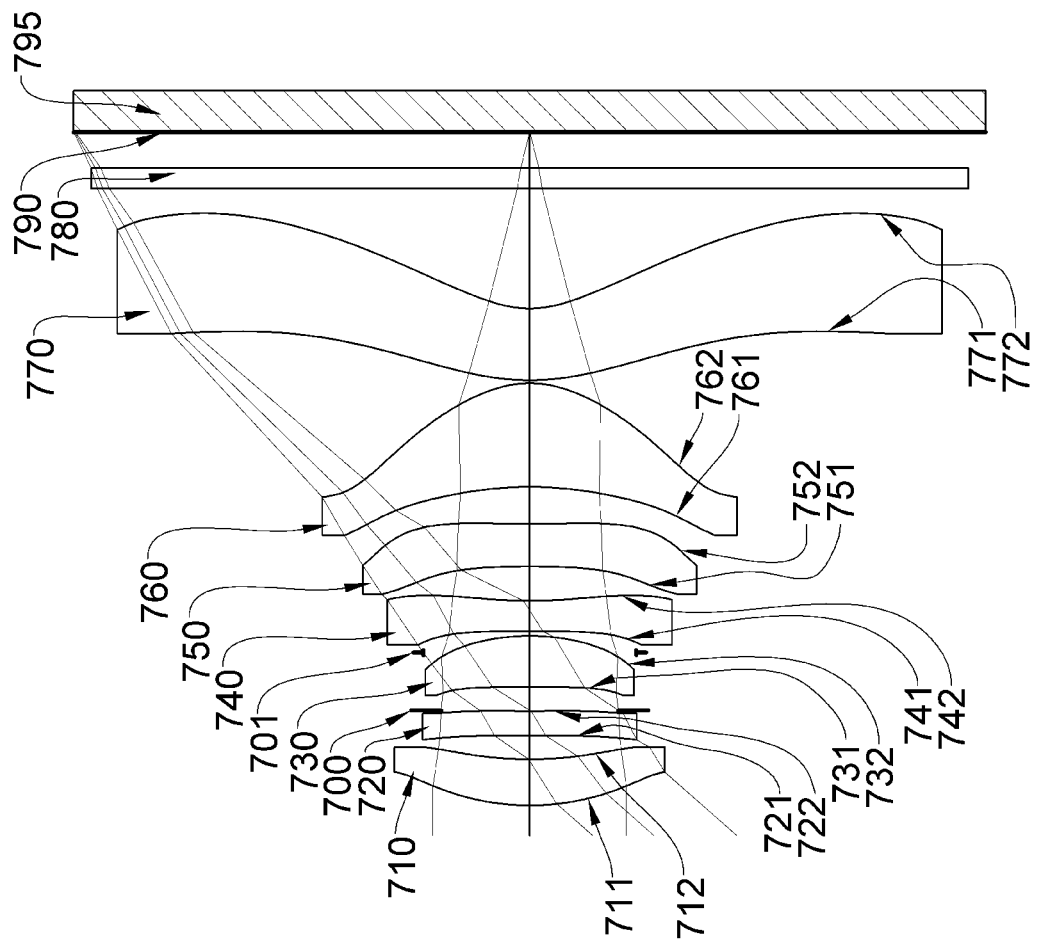
FIG. 7A is a schematic view of an image capturing apparatus according to the 7th embodiment of the present disclosure.
Figure 7B:
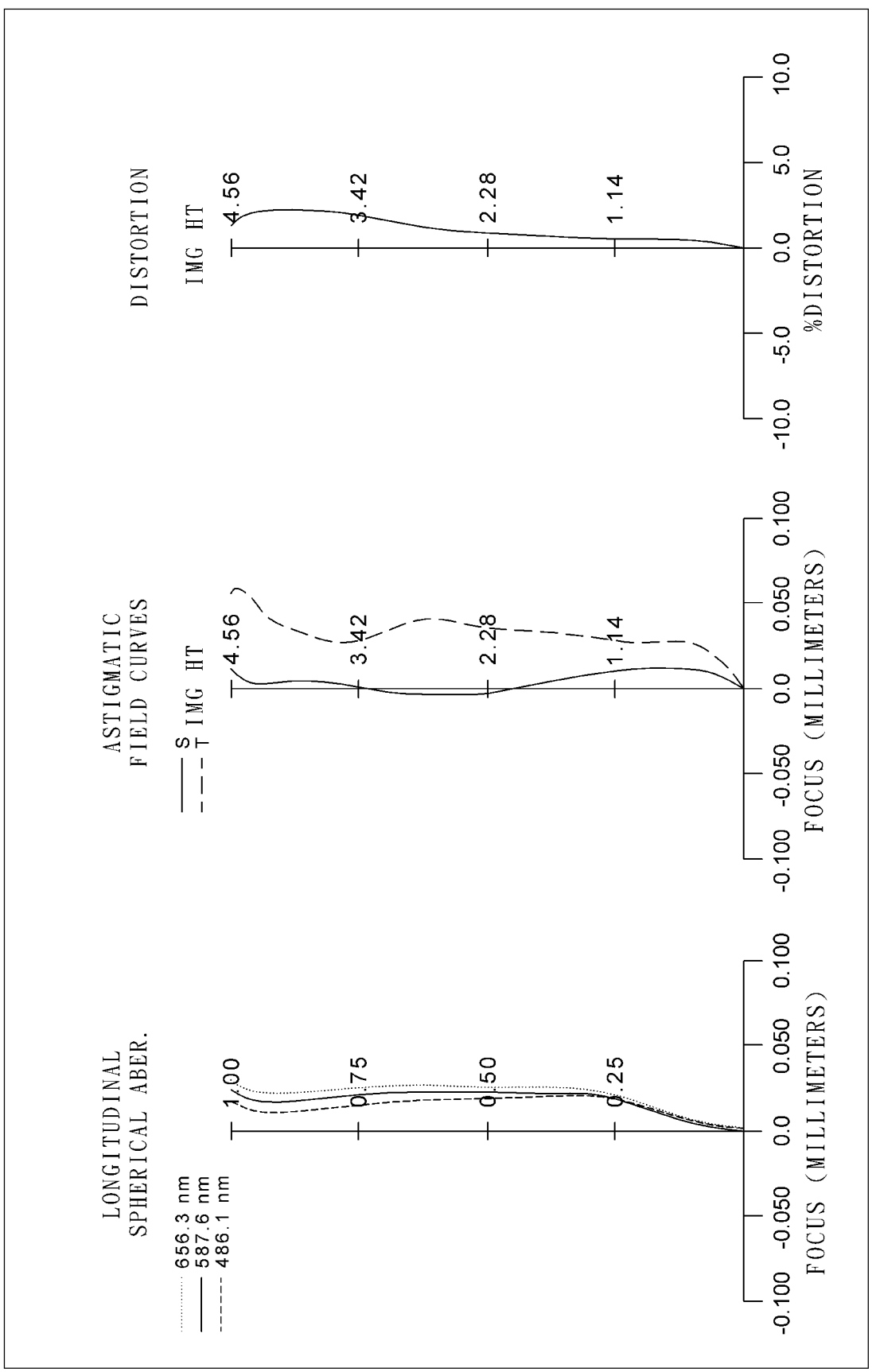
FIG. 7B shows longitudinal spherical aberration curves, astigmatic field curves and a distortion curve of the image capturing apparatus according to the 7th embodiment.

FIG. 7A is a schematic view of an image capturing apparatus according to the 7th embodiment of the present disclosure. FIG. 7B shows, in order from left to right, longitudinal spherical aberration curves, astigmatic field curves and a distortion curve of the image capturing apparatus according to the 7th embodiment.

In FIG. 7A, the image capturing apparatus includes a photographing optical lens assembly (not otherwise herein labeled) of the present disclosure and an image sensor 795. The photographing optical lens assembly includes, in order from an object side to an image side, a first lens element 710, a second lens element 720, an aperture stop 700, a third lens element 730, a stop 701, a fourth lens element 740, a fifth lens element 750, a sixth lens element 760, a seventh lens element 770, and an image surface 790. The image sensor 795 is disposed on or near the image surface 790, and the photographing optical lens assembly includes seven lens elements (710, 720, 730, 740, 750, 760 and 770) without any other lens element being inserted between them.

The first lens element 710 with positive refractive power has an object-side surface 711 being convex in a paraxial region thereof, and an image-side surface 712 being concave in a paraxial region thereof. Both the object-side surface 711 and the image-side surface 712 are aspheric. The first lens element 710 is made of plastic material.

The second lens element 720 with negative refractive power has an object-side surface 721 being convex in a paraxial region thereof, and an image-side surface 722 being concave in a paraxial region thereof. Both the object-side surface 721 and the image-side surface 722 are aspheric. The second lens element 720 is made of plastic material.

The third lens element 730 with positive refractive power has an object-side surface 731 being plano in a paraxial region thereof, and an image-side surface 732 being convex in a paraxial region thereof. Both the object-side surface 731 and the image-side surface 732 are aspheric. The third lens element 730 is made of plastic material.

The fourth lens element 740 with negative refractive power has an object-side surface 741 being concave in a paraxial region thereof, and an image-side surface 742 being concave in a paraxial region thereof and having at least one convex critical point in an off-axis region thereof. Both the object-side surface 741 and the image-side surface 742 are aspheric. The fourth lens element 740 is made of plastic material.

The fifth lens element 750 with negative refractive power has an object-side surface 751 being concave in a paraxial region thereof, and an image-side surface 752 being concave in a paraxial region thereof. Both the object-side surface 751 and the image-side surface 752 are aspheric. The fifth lens element 750 is made of plastic material.

The sixth lens element 760 with positive refractive power has an object-side surface 761 being concave in a paraxial region thereof, and an image-side surface 762 being convex in a paraxial region thereof. Both the object-side surface 761 and the image-side surface 762 are aspheric. The sixth lens element 760 is made of plastic material.

The seventh lens element 770 with negative refractive power has an object-side surface 771 being convex in a paraxial region thereof and having at least one concave critical point in an off-axis region thereof, and an image-side surface 772 being concave in a paraxial region thereof and having at least one critical point in an off-axis region thereof. Both the object-side surface 771 and the image-side surface 772 are aspheric. The seventh lens element 770 is made of plastic material.

The photographing optical lens assembly further includes a filter 780 disposed between the seventh lens element 770 and the image surface 790. The filter 780 is made of glass material and does not affect the focal length of the photographing optical lens assembly.

The detailed optical data of the 7th embodiment are shown in TABLE 13, and the aspheric surface data are shown in TABLE 14.

TABLE 13

7th Embodiment f = 3.95 mm, Fno = 2.04, HFOV = 48.7 deg.

| Surface# | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.497 | ASP | 0.462 | Plastic | 1.545 | 56.0 | 12.92 |
| 2 | | 3.617 | ASP | 0.232 | | | | |
| 3 | Lens 2 | 27.088 | ASP | 0.250 | Plastic | 1.669 | 19.4 | −317.04 |
| 4 | | 23.932 | ASP | 0.009 | | | | |
| 5 | Ape. Stop | Plano | | 0.232 | | | | |

TABLE 13-continued

7th Embodiment f = 3.95 mm, Fno = 2.04, HFOV = 48.7 deg.

| Surface# | | Curvature Radius | | Thickness | Material | Index | Abbe # | Focal Length |
|---|---|---|---|---|---|---|---|---|
| 6 | Lens 3 | ∞ | ASP | 0.513 | Plastic | 1.544 | 55.9 | 4.08 |
| 7 | | −2.219 | ASP | −0.166 | | | | |
| 8 | Stop | Plano | | 0.212 | | | | |
| 9 | Lens 4 | −57.432 | ASP | 0.306 | Plastic | 1.634 | 23.8 | −6.16 |
| 10 | | 4.198 | ASP | 0.344 | | | | |
| 11 | Lens 5 | −17.315 | ASP | 0.427 | Plastic | 1.544 | 55.9 | −12.30 |
| 12 | | 10.988 | ASP | 0.372 | | | | |
| 13 | Lens 6 | −3.661 | ASP | 1.039 | Plastic | 1.544 | 55.9 | 2.33 |
| 14 | | −1.034 | ASP | 0.030 | | | | |
| 15 | Lens 7 | 2.332 | ASP | 0.719 | Plastic | 1.650 | 21.8 | −3.33 |
| 16 | | 0.986 | ASP | 1.200 | | | | |
| 17 | Filter | Plano | | 0.210 | Glass | 1.517 | 64.2 | — |
| 18 | | Plano | | 0.358 | | | | |
| 19 | Image Surface | Plano | | — | | | | |

*Reference wavelength is d-line 587.6 nm.
The effective radius on surface #8 (the stop) is 1.065 mm.

TABLE 14

Aspheric Coefficients

| Surface # | 1 | 2 | 3 | 4 | 6 | 7 | 9 |
|---|---|---|---|---|---|---|---|
| k = | 8.9777E−01 | 6.6598E+00 | −8.8260E+01 | −7.7224E+01 | 0.0000E+00 | −1.2745E+00 | 9.0000E+01 |
| A4 = | −3.5829E−03 | −2.6090E−02 | −7.2290E−02 | −7.8507E−02 | −7.1309E−02 | 5.7655E−02 | −4.3818E−05 |
| A6 = | −7.7730E−03 | −2.6370E−02 | 6.5978E−02 | 2.8297E−02 | −2.5740E−02 | −5.3884E−01 | −3.5510E−01 |
| A8 = | 2.1113E−03 | 2.2814E−02 | −2.6149E−01 | −1.2102E−01 | 3.8270E−03 | 1.7367E+00 | 1.0551E+00 |
| A10 = | −5.3590E−02 | −1.3121E−02 | 8.5491E−01 | 8.3549E−01 | −1.8950E−01 | −4.1036E+00 | −2.0919E+00 |
| A12 = | 7.3786E−02 | −7.7839E−02 | −1.7345E+00 | −2.7249E+00 | 8.1296E−01 | 6.5024E+00 | 2.7323E+00 |
| A14 = | −6.5460E−02 | 1.4849E−01 | 2.2127E+00 | 5.1414E+00 | −1.7663E+00 | −6.7552E+00 | −2.3178E+00 |
| A16 = | 3.4803E−02 | −1.3092E−01 | −1.7191E+00 | −5.6631E+00 | 2.0860E+00 | 4.3844E+00 | 1.2166E+00 |
| A18 = | −1.0567E−02 | 6.0019E−02 | 7.4330E−01 | 3.3820E+00 | −1.3083E+00 | −1.6116E+00 | −3.5689E−01 |
| A20 = | 1.4175E−03 | −1.1429E−02 | −1.3701E−01 | −8.4565E−01 | 3.3587E−01 | 2.5484E−01 | 4.4355E−02 |

| Surface # | 10 | 11 | 12 | 13 | 14 | 15 | 16 |
|---|---|---|---|---|---|---|---|
| k = | −1.9982E+01 | 8.9735E+01 | −5.9260E+01 | 2.1386E−02 | −3.8085E+00 | −7.3276E−01 | −4.2898E+00 |
| A4 = | −5.3122E−02 | −1.0413E−01 | −8.9434E−02 | 3.2746E−03 | −1.3767E−01 | −5.4138E−02 | −1.0864E−02 |
| A6 = | 1.4901E−02 | 7.1328E−02 | 9.2988E−02 | 3.6253E−02 | 1.2876E−01 | 1.1526E−02 | −1.0864E−02 |
| A8 = | −3.1138E−03 | −1.6315E−01 | −1.6171E−01 | −5.5502E−02 | −1.1369E−01 | −2.5296E−03 | −6.9793E−05 |
| A10 = | −7.0567E−03 | 2.7827E−01 | 1.8167E−01 | 3.8987E−02 | 7.4301E−02 | 4.4570E−04 | −4.8325E−06 |
| A12 = | 6.7853E−03 | −2.9079E−01 | −1.3459E−01 | −1.4014E−02 | −3.3298E−02 | −5.6861E−05 | 1.7903E−06 |
| A14 = | −9.4476E−04 | 1.9105E−01 | 6.3816E−02 | 1.0514E−03 | 9.9530E−03 | 4.8997E−06 | −2.1244E−07 |
| A16 = | −1.1675E−04 | −7.4746E−02 | −1.8757E−02 | 9.1182E−05 | −1.8440E−03 | −2.6676E−07 | 1.3183E−08 |
| A18 = | 5.3318E−04 | 1.5724E−02 | 3.1188E−03 | −2.7669E−04 | 1.8809E−04 | 8.2391E−09 | −4.1800E−10 |
| A20 = | −7.5244E−05 | −1.3640E−03 | −2.2138E−04 | 2.3737E−05 | −8.0192E−06 | −1.1016E−10 | 5.2732E−12 |

In the 7th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 7th embodiment, so an explanation in this regard will not be provided again.

Moreover, these parameters can be calculated from TABLE 13 and TABLE 14 and satisfy the conditions stated in the table below.

| 7th Embodiment | | | |
|---|---|---|---|
| f [mm] | 3.95 | CT6/CT3 | 2.03 |
| Fno | 2.04 | CT6/CT4 | 3.40 |
| HFOV [deg.] | 48.7 | CT6/CT5 | 2.43 |
| FOV [deg.] | 97.4 | CT6/CT7 | 1.45 |
| V1/N1 | 36.27 | ΣCT/ΣAT | 2.94 |
| V2/N2 | 11.65 | (R5 + R6)/(R5 − R6) | 1.00 |
| V3/N3 | 36.23 | f/R8 | 0.94 |
| V4/N4 | 14.59 | Y11/Y72 | 0.33 |
| V5/N5 | 36.23 | |Y71−Y62|/f | 0.38 |
| V6/N6 | 36.23 | Y72/f | 1.05 |
| V7/N7 | 13.21 | TL/f | 1.71 |
| V4 + V5 | 79.78 | TL/(f*sin(HFOV)) | 2.28 |
| CT6/CT1 | 2.25 | TL/ImgH | 1.48 |
| CT6/(CT1 + CT2) | 1.46 | |f/f1| + |f/f2| | 0.32 |
| CT6/CT2 | 4.16 | |f/f6|/(|f/f1| + |f/f2| + |f/f4| + |f/f5|) | 1.33 |

8th Embodiment

Figure 8:
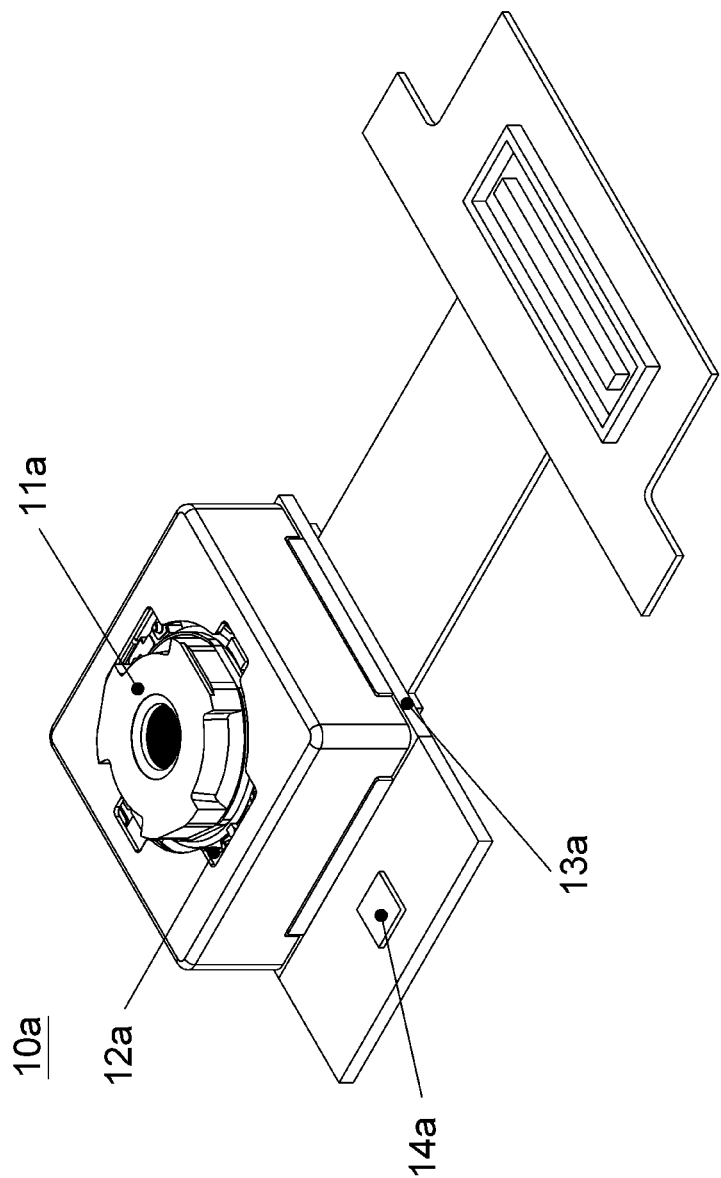
FIG. 8 is a 3-dimensional schematic view of an image capturing apparatus according to the 8th embodiment of the present disclosure.

FIG. 8 is a 3-dimensional schematic view of an image capturing apparatus 10a according to the 8th embodiment of the present disclosure. In the present embodiment, the image capturing apparatus 10a is a camera module. The image capturing apparatus 10a includes a lens unit 11a, a driving device 12a, and an image sensor 13a. The lens unit 11a includes the photographing optical lens assembly of the 1st embodiment described above and a lens barrel (not otherwise herein labeled) for carrying the photographing optical lens assembly. The image capturing apparatus 10a receives light and generates an image by using the lens unit 11a, uses the driving device 12a to adjust the focus to photograph on the image sensor 13a and outputs the image data thereafter.

The driving device 12a may be an auto-focus module that can be driven by a voice coil motor (VCM), a micro electro-mechanical system (MEMS), a piezoelectric system, shape memory alloys or other driving systems. The driving device 12a allows the lens unit 11a to obtain a better imaging position, so that a clear image can be obtained wherever an imaged object 30 (please refer to FIG. 9B) is positioned with different object distances.

The image capturing apparatus 10a may be equipped with an image sensor 13a (e.g., CMOS, CCD) with high sensitivity and low noise on the image surface of the photographing optical lens assembly to accurately provide satisfactory image quality obtained from the photographing optical lens assembly.

In addition, the image capturing apparatus 10a may further include an image stabilizer 14a, which may be a dynamic sensing element such as an accelerometer, a gyro sensor or a Hall Effect sensor. The image stabilizer 14a in the 8th embodiment is a gyro sensor but is not limited thereto. By adjusting the photographing optical lens assembly in different axial directions to provide a compensation for image blurs due to motion during exposures, the image quality under dynamic and low-light circumstances can be further improved, and enhanced image compensation functions such as optical image stabilization (OIS) or electronic image stabilization (EIS) can also be provided.

9th Embodiment

Figure 9A:
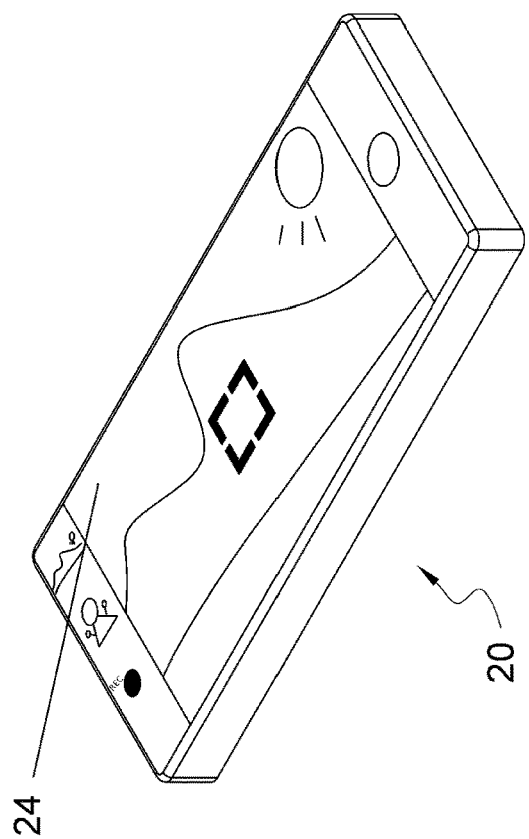
FIG. 9A is a 3-dimensional schematic view of an electronic device according to the 9th embodiment of the present disclosure.
Figure 9A:
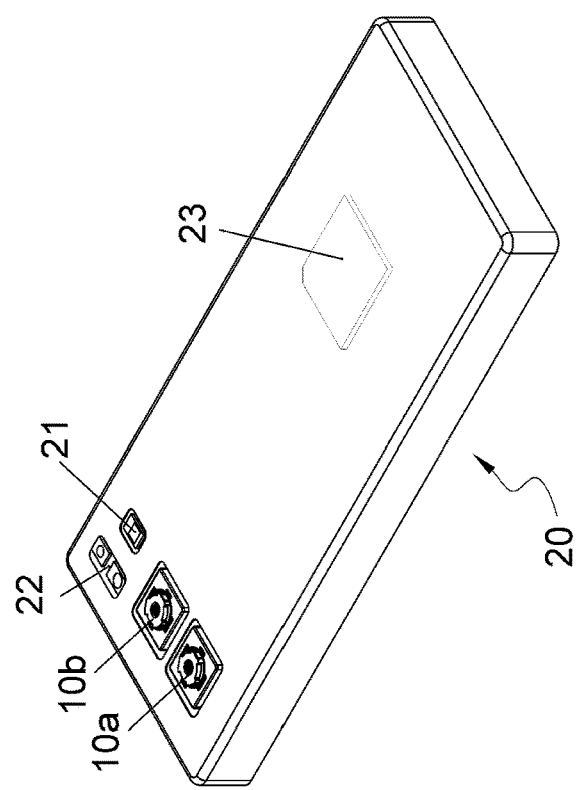
Figure 9B:
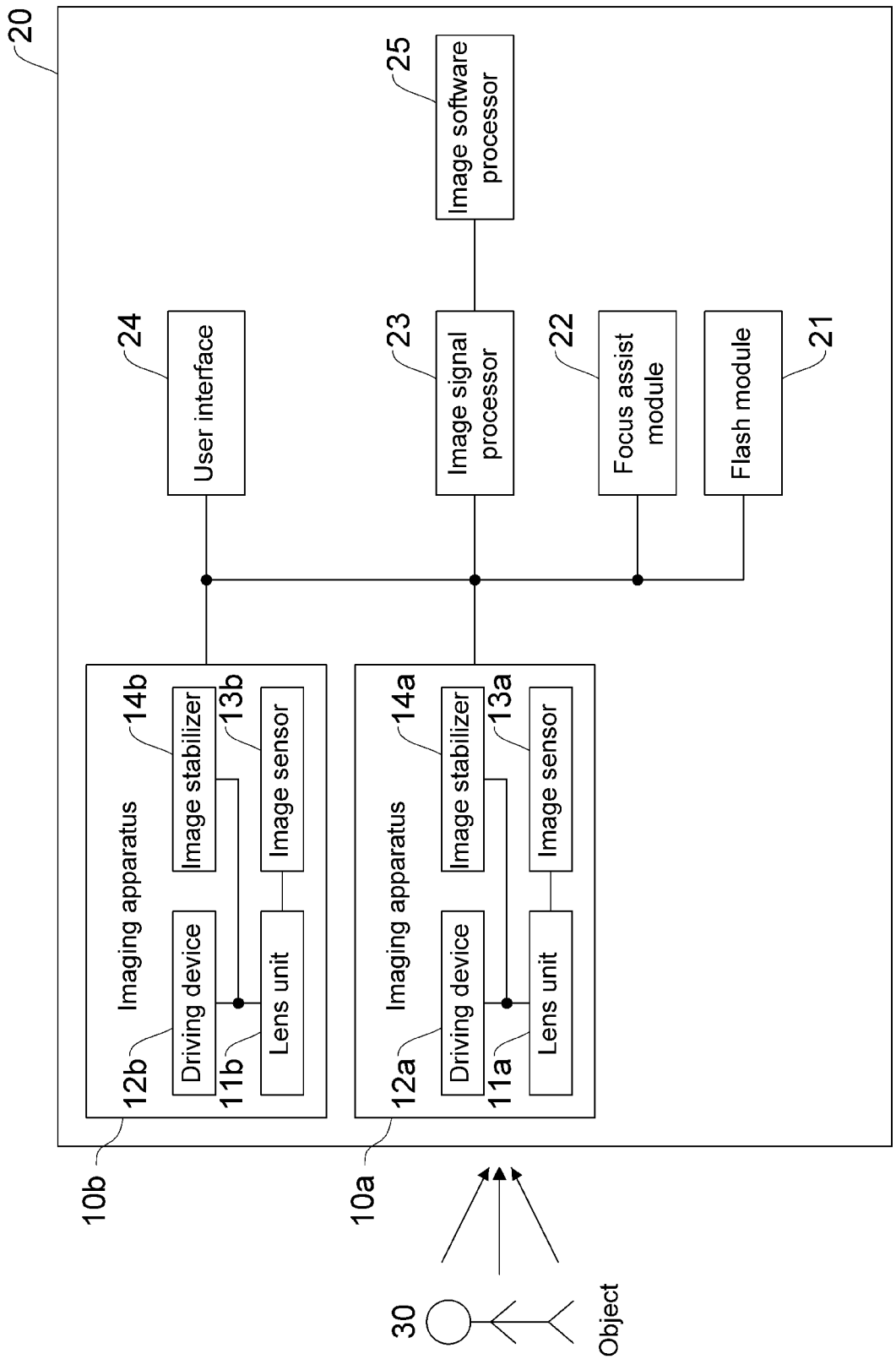
FIG. 9B is a functional block diagram of the electronic device according to the 9th embodiment of the present disclosure.

Please refer to FIG. 9A and FIG. 9B. FIG. 9A is a 3-dimensional schematic view of an electronic device 20 according to the 9th embodiment of the present disclosure. FIG. 9B is a functional block diagram of the electronic device 20 shown in FIG. 9A. In the present embodiment, the electronic device 20 is a smart phone. The electronic device 20 includes the image capturing apparatus 10a of the 8th embodiment, an image capturing apparatus 10b, a flash module 21, a focus assist module 22, an image signal processor 23, a user interface 24, and an image software processor 25 (please refer to FIG. 9B).

In the present embodiment, the electronic device 20 includes two image capturing apparatuses 10a and 10b facing toward the same direction. The image capturing apparatus 10a is a primary lens unit, and the image capturing apparatus 10b is a wide-angle lens unit; alternatively, the image capturing apparatus 10b may be a telephoto lens unit. However, configurations are not limited to those described herein. For example, the two image capturing apparatuses may both be image capturing apparatuses 10a or may be other combinations. Besides, the electronic device 20 may include only one image capturing apparatus 10a or may include three or more image capturing apparatuses (e.g., image capturing apparatus 10a, a wide-angle lens unit and a telephoto lens unit).

When a user utilizes the user interface 24 to capture images of the object 30 (please refer to FIG. 9B), the electronic device 20 receives light and captures an image via at least one of the image capturing apparatuses 10a and 10b, triggers the flash module 21 to compensate insufficient light level, and focuses instantly according to the distance information of the object 30 provided by the focus assist module 22. The images are further optimized by the image signal processor 23 to further enhance the image quality generated by the photographing optical lens assembly. The focus assist module 22 may adopt an infrared ray or laser focus assist system to achieve quick focusing. The user interface 24 may include a touch screen or a physical shooting button to cooperate with various functions of the image software processor 25 for performing image capturing and image processing.

The image capturing apparatus 10a of the present disclosure is not limited to being applied to smartphones. The image capturing apparatus 10a may be used in focus adjusting systems depending on the needs, while it features excellent aberration correction and provides satisfactory image quality. For example, the image capturing apparatus 10a may be applied to a variety of applications such as car electronics, drones, smart electronic products, tablet computers, wearable devices, medical devices, precision instruments, surveillance cameras, portable video recorders, identification systems, multi-lens devices, somatosensory detections, virtual realities, motion devices, home intelligent auxiliary systems and other electronic devices.

The aforementioned electronic devices are only exemplary, and the application of the image capturing apparatus according to the present disclosure is not limited thereto. Preferably, the electronic device can further include a control unit, a display unit, a storage unit, a random access memory (RAM) unit or a combination thereof.

The foregoing description, for purpose of explanation, has been described with reference to specific embodiments. It is to be noted that TABLES 1-14 show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising seven lens elements, the seven lens elements being, in order from an object side to an image side: a first lens element, a second lens element, a third lens element, a fourth lens element, a fifth lens element, a sixth lens element, and a seventh lens element;

wherein the third lens element has positive refractive power, the third lens element has an image-side surface being convex in a paraxial region thereof, the fourth lens element has an image-side surface being concave in a paraxial region thereof, the fifth lens element has negative refractive power, the sixth lens element has positive refractive power, the sixth lens element has an object-side surface being concave in a paraxial region thereof and an image-side surface being convex in a paraxial region thereof, the seventh lens element has an image-side surface being concave in a paraxial region thereof and having at least one critical point in an off-axis region thereof, an object-side surface and the image-side surface of the seventh lens element are both aspheric;

wherein a focal length of the photographing optical lens assembly is f, a curvature radius of the image-side surface of the fourth lens element is R8, a sum of central thicknesses of the seven lens elements is ΣCT, a sum of axial distances between each of adjacent lens elements of the photographing optical lens assembly is ΣAT, a curvature radius of an object-side surface of the third lens element is R5, a curvature radius of the image-side surface of the third lens element is R6, and the following conditions are satisfied:

0.45<f/R8;

2.75<ΣCT/ΣAT; and 0.10<(R5+R6)/(R5−R6).

2. The photographing optical lens assembly of claim 1, wherein the focal length of the photographing optical lens assembly is f, a focal length of the first lens element is f1, a focal length of the second lens element is f2, and the following condition is satisfied:

|f/f1|+|f/f2|<0.60.

3. The photographing optical lens assembly of claim 1, wherein the curvature radius of the object-side surface of the third lens element is R5, the curvature radius of the image-side surface of the third lens element is R6, and the following condition is satisfied:

1.0≤(R5+R6)/(R5−R6)<2.50.

4. The photographing optical lens assembly of claim 1, wherein the first lens element has an image-side surface being concave in a paraxial region thereof.

5. The photographing optical lens assembly of claim 1, wherein the focal length of the photographing optical lens assembly is f, the curvature radius of the image-side surface of the fourth lens element is R8, and the following condition is satisfied:

0.75<f/R8<2.0.

6. The photographing optical lens assembly of claim 1, wherein an effective radius on an object-side surface of the first lens element is Y11, an effective radius on the image-side surface of the seventh lens element is Y72, and the following condition is satisfied:

Y11/Y72<0.50.

7. The photographing optical lens assembly of claim 1, wherein an Abbe number of the fourth lens element is V4, an Abbe number of the fifth lens element is V5, and the following condition is satisfied:

20<V4+V5<75.

8. The photographing optical lens assembly of claim 1, wherein the sum of the central thicknesses of the seven lens elements is ΣCT, the sum of the axial distances between each of adjacent lens elements of the photographing optical lens assembly is ΣAT, and the following condition is satisfied:

3.0<ΣCT/ΣAT<5.0.

9. The photographing optical lens assembly of claim 1, wherein the fourth lens element has an object-side surface being convex in a paraxial region thereof and having at least one concave critical point in an off-axis region thereof.

10. The photographing optical lens assembly of claim 1, wherein the image-side surface of the fourth element has at least one convex critical point in an off-axis region thereof.

11. The photographing optical lens assembly of claim 1, wherein the focal length of the photographing optical lens assembly is f, a focal length of the first lens element is f1, a focal length of the second lens element is f2, a focal length of the fourth lens element is f4, a focal length of the fifth lens element is f5, a focal length of the sixth lens element is f6, and the following condition is satisfied:

1.0<|f/f6|/(|f/f1|+|f/f2|+|f/f4|+|f/f5|)<4.0.

12. The photographing optical lens assembly of claim 1, wherein an effective radius on the image-side surface of the seventh lens element is Y72, the focal length of the photographing optical lens assembly is f, and the following condition is satisfied:

0.85<Y72/f.

13. The photographing optical lens assembly of claim 1, wherein a maximum effective radius on the object-side surface of the seventh lens element is Y71, a maximum effective radius on the image-side surface of the sixth lens element is Y62, the focal length of the photographing optical lens assembly is f, and the following condition is satisfied:

0.20<|Y71−Y62|/f<0.50.

14. The photographing optical lens assembly of claim 1, wherein a central thickness of the first lens element is CT1, a central thickness of the second lens element is CT2, a central thickness of the third lens element is CT3, a central thickness of the fourth lens element is CT4, a central thickness of the fifth lens element is CT5, a central thickness of the sixth lens element is CT6, a central thickness of the seventh lens element is CT7, and the following conditions are satisfied:

1.0<CT6/CT1;

1.0<CT6/CT2;

1.0<CT6/CT3;

1.0<CT6/CT4;

1.0<CT6/CT5; and 1.0<CT6/CT7.

15. The photographing optical lens assembly of claim 1, wherein the object-side surface of the seventh lens element is convex in a paraxial region thereof and having at least one concave critical point in an off-axis region thereof.

16. The photographing optical lens assembly of claim 1, wherein an Abbe number of a lens element in the photographing optical lens assembly is V, a refractive index of said lens element is N, and at least one lens element satisfies the following condition:

8.0<V/N<11.9.

17. The photographing optical lens assembly of claim 1, wherein an axial distance between an object-side surface of the first lens element and an image surface is TL, the focal length of the photographing optical lens assembly is f, and the following condition is satisfied:

$$1.5 < TL/f < 3.0.$$

18. The photographing optical lens assembly of claim 1, wherein an axial distance between an object-side surface of the first lens element and an image surface is TL, the focal length of the photographing optical lens assembly is f, half of a maximum field of view of the photographing optical lens assembly is HFOV, and the following condition is satisfied:

$$2.0 < TL/(f*\sin(HFOV)) < 4.0.$$

19. The photographing optical lens assembly of claim 1, wherein a maximum field of view of the photographing optical lens assembly is FOV, an f-number of the photographing optical lens assembly is Fno, an axial distance between an object-side surface of the first lens element and an image surface is TL, a maximum image height of the photographing optical lens assembly is ImgH, and the following conditions are satisfied:

95 degrees $< FOV <$ 130 degrees;

$1.2 < Fno < 2.8$; and $0.70 < TL/\mathrm{ImgH} < 1.60.$

20. The photographing optical lens assembly of claim 1, wherein the fourth lens element has negative refractive power and the fifth lens element has negative refractive power.

21. The photographing optical lens assembly of claim 1, wherein a central thickness of the first lens element is CT1, a central thickness of the second lens element is CT2, a central thickness of the sixth lens element is CT6, and the following condition is satisfied:

$$1.25 < CT6/(CT1+CT2) < 3.0.$$

22. An image capturing apparatus, comprising the photographing optical lens assembly of claim 1 and an image sensor disposed on an image surface of the photographing optical lens assembly.

23. An electronic device, comprising the image capturing apparatus of claim 22.

* * * * *